Sept. 10, 1968 F. K. BECKER 3,401,342

SUPPRESSED CARRIER TRANSMISSION SYSTEM FOR MULTILEVEL AMPLITUDE MODULATED DATA SIGNALS

Filed May 28, 1965 16 Sheets-Sheet 1

INVENTOR
F. K. BECKER
BY
Charles Scott Phelan
ATTORNEY

Sept. 10, 1968 F. K. BECKER 3,401,342

SUPPRESSED CARRIER TRANSMISSION SYSTEM FOR MULTILEVEL AMPLITUDE MODULATED DATA SIGNALS

Filed May 28, 1965 16 Sheets-Sheet 7

Sept. 10, 1968 F. K. BECKER 3,401,342

SUPPRESSED CARRIER TRANSMISSION SYSTEM FOR MULTILEVEL AMPLITUDE MODULATED DATA SIGNALS

Filed May 28, 1965 16 Sheets-Sheet 11

Sept. 10, 1968 F. K. BECKER 3,401,342

SUPPRESSED CARRIER TRANSMISSION SYSTEM FOR MULTILEVEL AMPLITUDE MODULATED DATA SIGNALS

Filed May 28, 1965 16 Sheets-Sheet 12

Sept. 10, 1968 F. K. BECKER 3,401,342
SUPPRESSED CARRIER TRANSMISSION SYSTEM FOR MULTILEVEL AMPLITUDE MODULATED DATA SIGNALS
Filed May 28, 1965 16 Sheets-Sheet 13

Sept. 10, 1968 F. K. BECKER 3,401,342

SUPPRESSED CARRIER TRANSMISSION SYSTEM FOR MULTILEVEL AMPLITUDE MODULATED DATA SIGNALS

Filed May 28, 1965 16 Sheets-Sheet 16

United States Patent Office 3,401,342

Patented Sept. 10, 1968

3,401,342

SUPPRESSED CARRIER TRANSMISSION SYSTEM FOR MULTILEVEL AMPLITUDE MODULATED DATA SIGNALS

Floyd K. Becker, Colts Neck, N.J., assignor to Bell Telephone Laboratories, Incorporated, New York, N.Y., a corporation of New York Filed May 28, 1965, Ser. No. 459,659
20 Claims. (Cl. 325—324)

ABSTRACT OF THE DISCLOSURE

A data transmission system employing vestigial sideband modulation and multilevel coding is provided to ensure efficient bandwidth utilization. An automatic transversal filter equalizer is coordinated with automatic phase and symbol recovery circuits during an initial start-up sequence to provide a reconstituted data signal at a receiver. A digital AGC circuit is employed to ensure that the multilevel coded signal can be accurately decoded.

This invention relates to a data transmission system. More particularly, the invention relates to a high speed transmission system of that type which is suitable for communication over good quality voice transmission channels.

The advancing technologies constantly impose pressures for increases in the rate of communication between persons or between machines. Usually an increased rate of communication means that there will be a need for an increase in the communication channel bandwidth. However, there is also an opposing pressure to conserve the limited frequency spectrum that is available to the art at the present day in order to provide adequate facilities for communications among an ever increasing number of users of communication systems.

It is, therefore, one object of the present invention to increase the rate of communication which is possible over readily available communication channels such as, for example, channels that are suitable for voice transmission.

Present day business, or computing, machines often communicate by means of some code system which is convenient for representing information in the form of electric current signals. Binary coding of conventional alphanumeric text is one such system. However, the binary digit rate of communication capability of such machines far exceeds the capability of good voice communications circuits. Consequently, in order to accommodate the higher speed capabilities of such machines it has generally been the practice to provide the relatively more expensive broadband communication circuits for facilitating such communication.

It is, therefore, another object of the invention to enable communication over circuits at bit rates which are in excess of the normal bandwidth capabilities of such circuits.

The advent of practical automatic equalizers has made possible communication with considerable fidelity over a wide variety of circuit combinations without the need for time consuming trial and error equalization of such circuits to compensate for the characteristic distortions which are injected in signals transmitted over such combination circuits. One such automatic equalizer is shown in the copending application of F. K. Becker, R. W. Lucky, and E. Port which is entitled "Automatic Equalizer for Digital Transmission Systems" and is otherwise designated application Ser. No. 396,836 which was filed on Sept. 16, 1964 now U.S. Patent No. 3,292,110. However, even refined equalization techniques, such as are taught in the aforementioned Becker et al. application, cannot cope with the problems of providing amplitude stability with respect to a reference or timing phase stability such as is required for synchronous reception of data. Indeed, such equalizers are dependent upon adequate solutions being found by means external to the equalizer.

It is, therefore, another object of the present invention to improve automatic means for controlling signal amplitude and phase relationships to make them compatible with the capabilities of known automatic equalizers.

These and other objects of the invention are realized in one illustrative embodiment wherein data signals to be transmitted are received in a binary coded form and converted into a multilevel coding form for representing the binary coded characters. The resulting multilevel data symbols amplitude modulate a carrier wave having a frequency advantageously located for the transmission channel which is to be utilized. The modulated signals are optimally transmitted, with the modulation carrier suppressed, from one terminal to another on a communication channel having a bandwidth which is only slightly larger than the symbol rate, but which bandwidth is much less than the binary coded data rate. The circuit may include any suitable transmission means such as wire, radio, a combination of both wire and radio, or any other transmission medium which is suitable at least for voice communication.

In the system receiving terminal the average signal level is controlled to maintain a predetermined substantially constant level in order to offset dynamic transmission effects. One such effect which is sometimes experienced is radio transmission fade due to atmospheric conditions. The suppressed carrier frequency of the transmitted signal is recovered and phase adjusted in a demodulator in accordance with the low frequency demodulator output products, such as a direct current component or an alternating current component which lies in the frequency spectrum far below the symbol rate of transmission. The demodulated, or baseband, multilevel signal is then equalized by an automatic equalizer and thereafter decoded to derive the original binary signal from the multilevel coded signal. The decoding circuits include further phase adjusting arrangements to set the phase of the recovered timing wave used for decoding to an optimum phase relation as a function of certain amplitude level characteristics of the received data signal.

It is one feature of the invention that automatic arrangements for signal amplitude control and local timing phase control make it possible to stabilize input signals adequately so that decoding equipment can accurately discriminate among a relatively large number of discrete information-determinant signal amplitude levels.

It is another feature that unilateral automatic gain control circuits are utilized in the receiving terminal to facilitate the maintenance of substantially constant signal amplitude in spite of wide input amplitude variations such as can be experienced in heterogeneous transmission circuits. The unilateral gain control is adapted to maintain input signal amplitude within a range which is substantially less than $1/n-1$ times the largest information determinant amplitude level where $n$ is the number of transmitted levels. For example, in a sixteen level transmission system the unilateral automatic gain control system maintains signal amplitude within a range which is smaller than one-fifteenth of the largest information determinant signal amplitude.

A further feature of the invention is that multilevel amplitude modulated data signals are demodulated before being equalized in order to compensate economically for indeterminate static characteristic transmission distortion in a particular communication channel which is being utilized for the transmission of data.

A further feature of the invention is that modulated data signals are demodulated under the control of locally recovered carrier frequency that has the phase thereof automatically supervised and adjusted during signal transmission to correct the relationship to the data signal by means of certain low frequency energy components of the demodulator output signal.

Still another feature of the invention is that a start-up or training interval normally employed for initializing automatic equalizers for any particular transmission channel to be employed is also utilized in the present invention to initialize the recovered carrier phase, without phase ambiguity, to a proper relationship with the input signal.

An additional feature of the invention is that multilevel coded data information is decoded under the control of a recovered timing wave which has its phase supervised and adjusted during signal transmission to correct the phase relationship with respect to the received signal in accordance with certain signal amplitude characteristics of such signal.

Still another feature of the invention is that an automatic equalizer and the decoding timing wave phase adjusting circuit cooperate during the aforementioned start-up period to complement each other's functions and thereby speed up and improve the initialization of both functions.

A more complete understanding of the invention and various features, objects, and advantages thereof may be obtained from a consideration of the following detailed description of an illustrative embodiment in connection with appended claims and the attached drawings wherein:

*Overall system*

Figures 1, 2, 3, 4:
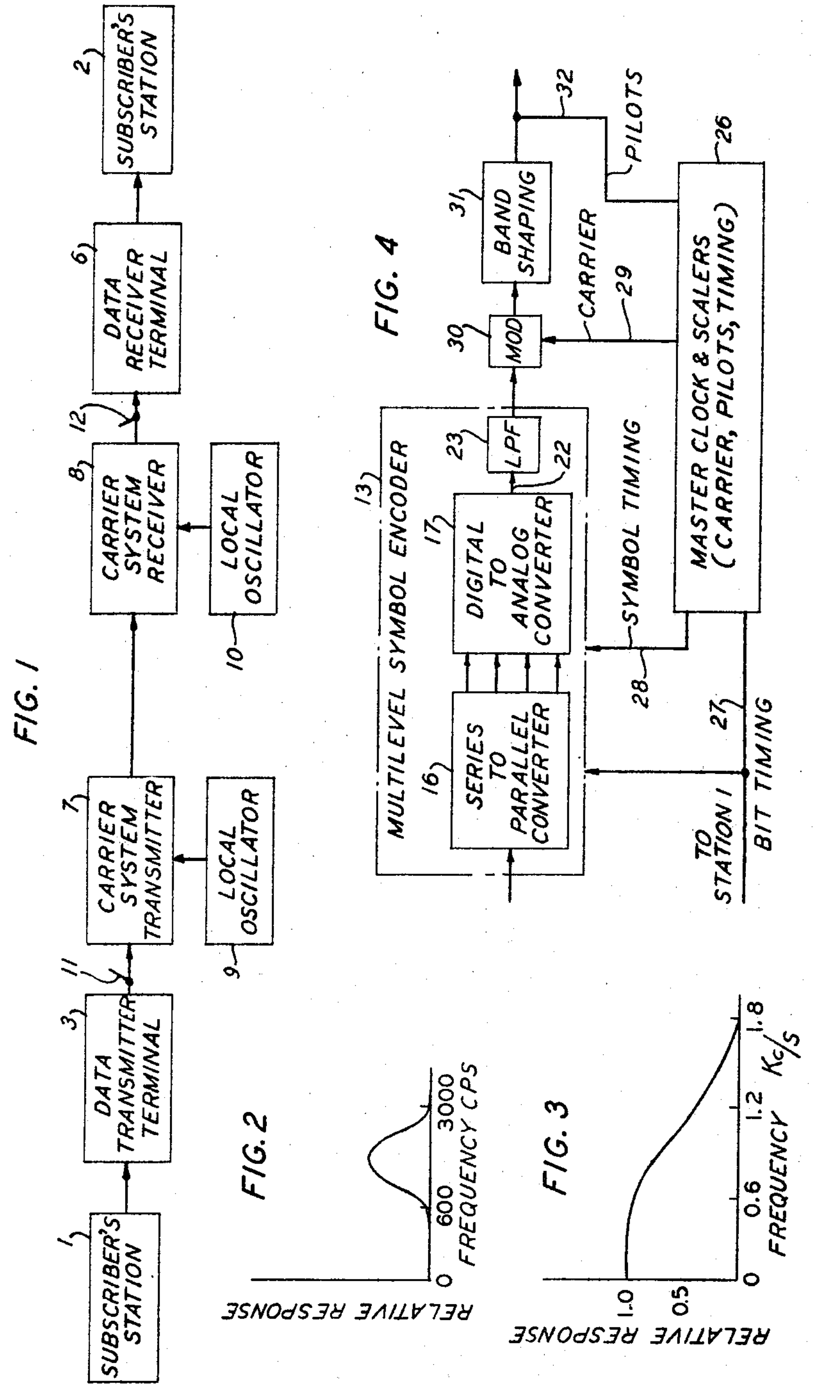
FIG. 1 is a simplified block and line diagram of a data transmission system in accordance with the present invention.
FIGS. 2 and 3 are frequency spectrum diagrams utilized to illustrate certain aspects of the invention.
FIG. 4 is a more detailed block and line diagram of the data transmitter terminal shown in FIG. 1.

In FIG. 1 two subscriber stations 1 and 2 are shown arranged for communication through the data transmission system of the present invention. Such system is herein described in the context of a system which might be provided by a telephone utility company since it is common practice for owners of computing business machines in different geographical locations to lease communications circuits from such a utility for linking their business machines together. The subscriber station 1 supplies binary coded data signals to a data transmitter terminal 3, which is also advantageously located on the subscriber's premises. Similarly, the subscriber having the subscriber station 2 also has located on his premises a data receiver terminal 6. It is to be understood, of course, that each subscriber would have both transmitting and receiving facilities for bidirectional communication in most cases. However, for the purpose of illustrating the principles of the present invention, it is sufficient to consider a single transmitter and a single data receiver.

Linking the transmitter terminal 3 and the receiving terminal 6 is a communication system which is, for illustrative purposes, shown to be a carrier system having a transmitting station 7 and a receiving station 8. The two stations shown schematically represent a full carrier system with repeaters at appropriate intervals and linking communications media which may include wire, radio, or some combination of both media, or any other communication medium which is at least suitable for a single voice communication channel. Each of the carrier system stations 7 and 8 has its respective local oscillator 9 and 10 which oscillators are utilized to provide the necessary carrier frequencies as is well known in the art. It is also known in the art that in certain carrier systems the local oscillators within the system are precisely controlled at their individual locations to operate at the same predetermined carrier frequency with only minor frequency tolerance. The oscillators are not themselves synchronized to maintain frequency. Accordingly, within the range of the mentioned tolerance, a carrier offset frequency $\Delta f$ can result in transmitted signals. This offset frequency $\Delta f$ is generally of no great significance in voice communications. However, in high speed data transmission systems the small $\Delta f$ frequency can cause considerable difficulty; and it is, therefore, taken into account in such data transmission systems as will be hereinafter described.

In accordance with the present invention the binary coded data from the subscriber station 1 is converted in the transmitter terminal 3 into a multilevel coded signal wherein each of the multibit binary coded data characters received from the station 1 is converted into a Gray code, multilevel symbol. The binary coded signal has two amplitude level possibilities for each bit, e.g., the zero amplitude for the binary ZERO digit and a different either positive or negative, amplitude for the binary ONE digit. However, in the present context, the term multilevel is utilized generally to designate systems which utilize more than two such information-determinant levels. Different numbers of levels can be utilized and the present invention is herein described in conjunction with an embodiment which utilizes one of the more difficult numbers of levels, namely, sixteen different amplitude levels. These levels are advantageously, although not necessarily, divided so that eight are positive levels and eight are negative levels in order to utilize the capabilities of the transmission channel in an efficient manner. The level coded signals modulate a carrier wave having a frequency which is advantageously chosen according to the transmission channel. In the embodiment utilized for illustration, the desired location for the center of the signal spectrum is 1800 cycles per second. This, in turn, determines the carrier frequency to be 2400 cycles per second. This modulated multilevel signal is then coupled from the data transmitter terminal 3 to the carrier system transmitter 7 wherein it is further modulated onto a particular higher frequency channel in the carrier system and transmitted to the receiver station 8. At the latter station the signal is extracted from its carrier system channel and applied as the modulated multilevel signal to the data receiver terminal 6. In that terminal the data is demodulated from its carrier and the multilevel signals are decoded to restore them to the original binary coded form which is then transmitted to the subscriber station 2.

It is to be understood with respect to the data transmission system illustrated in FIG. 1 that although only a single carrier communication circuit is shown, an individual subscriber may have a number of different geographical locations where there are businesss machines with which he may desire his own machine to communicate. Accordingly, he may have a number of leased communication facilities from his station 1 to each of the other stations and perhaps a complete network enabling any of the stations to communicate with any of the other stations. This condition is schematically indicated by the short diagonal line 11 between the terminal 3 and the carrier transmitter 7 and the similar diagonal line 12 between the carrier receiver 8 and the data terminal 6. These lines 11 and 12 schematically indicate the fact that a station with its data terminal may be selectively connected at the subscriber's option to any one of a plurality of communication circuits extending to different geographical locations. Similarly, since such circuits are provided by the telephone utility in accordance with the present description, it is possible that at any given time each such circuit or channel may include a different combination of communication media in different links of the circuit. Likewise, although the entire circuit has a particular specified minimum bandwidth it may not always have exactly the same distortion characteristics as any other circuit, as is well known in the art. It is desirable, however, in accordance with the present invention, that for the sixteen-level system herein described, each of such circuits should be at least a good quality voice communication circuit. That is, it should have a minimum useful bandwidth of approximately 2400 cycles per second, extending from 600 cycles per second to 3000 cycles per second.

It is known in the art that the center of the usable portion of a typical telephone channel lies at about 1800 cycles per second as previously mentioned. It is also known that a raised cosine spectrum which is symmetrical about a center frequency of a channel provides optimum transmission performance. FIG. 2 shows the envelope of such a raised cosine type of spectrum which is utilized in the transmission system of FIG. 1. This is the demodulated data spectrum at the input of the terminal 6. The spectrum extends from 600 cycles per second to 3000 cycles per second and centers on the 1800 cycles per second frequency which is the mentioned center frequency in the usable portion of a typical telephone channel. Vestigial sideband transmission is utilized in the data terminals, and a carrier frequency of 2400 cycles per second is advantageously employed. The ideal baseband spectrum for a 2400 symbol per second transmission rate would be 1200 cycles per second, but a 50 percent roll-off spectrum as shown in FIG. 3 for a vestigial sideband arrangement is actually employed as an advantageous compromise among factors such as ease of filter design, timing error probability, and available bandwidth.

*Transmitting terminal*

In FIG. 4 is illustrated a simplified block and line diagram of the basic functional components of the data transmitter terminal 3 shown in FIG. 1. A multilevel symbol encoder 13 receives binary coded data at the data bit rate from the subscriber station 1. This data is received in a series-to-parallel converter 16 which breaks the incoming data train up into four-bit character groups. As previously indicated, the invention is herein described in connection with a sixteen-level data transmission system. In this system, the incoming binary coded data is received at the rate of 9600 bits per second. In the converter 16 the four-bit characters are coupled in parallel from the converter 16 to a digital-to-analog converter 17 at the desired symbol rate of 2400 symbols per second. It will be noted that this symbol rate, divided by two, lies at the skew symmetry axis of FIG. 3, which corresponds to the lower axis of FIG. 2. The upper axis of skew symmetry of FIG. 2 satisfies the vestigial sideband shaping requirement.

Within the digital-to-analog converter 17 the Gray coded characters which are received in parallel from the series-to-parallel converter 16 are first converted to the natural binary coding system. The converter 17 then converts the binary coded characters into an analog multilevel form in which each of plural predetermined distinct amplitude levels represent a different character. It is advantageous in the present invention to utilize eight positive levels and eight negative levels which are substantially equally spaced with respect to one another and which are symmetricaly arranged with respect to the zero voltage amplitude axis. The converters 16 and 17 can be of any of the known types in the art and, for example, converter 16 may be simply a shift register into which the binary coded bits are shifted in series as they are received, and out of which they are extracted in parallel on a real time basis in four-bit groups. An array of logical gates is utilized in converter 17 for converting the Gray coded information into the binary code format.

Figure 5:
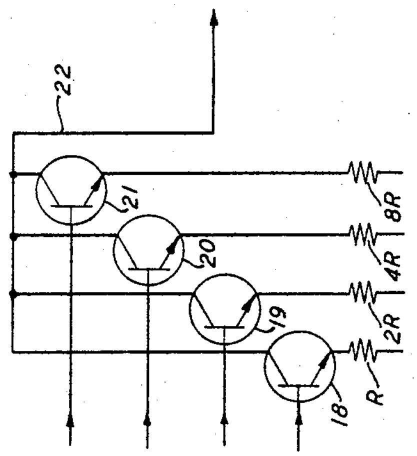
FIG. 5 is a partial schematic diagram of a digital-to-analog converter employed in FIG. 4.

The digital-to-analog converter 17 advantageously takes the form which is partially illustrated in FIG. 5 wherein the four input leads from converter 16 via the Gray-to-binary circuits mentioned are coupled to the base electrodes of four transistors 18, 19, 20, and 21. Each of those transistors is connected in a common collector configuration with particular emitter load resistors which are assigned resistance weightings in accordance with the desired analog conversions of the binary coded information. Thus, the resistors R, 2R, 4R, and 8R are connected, respectively, in the emitter circuits of the four transistors 18 through 21. Consequently, the collector current of each transistor in FIG. 5 which is driven into conduction by a binary ONE signal in the binary coded input information will conduct a collector electrode current which is a function of the magnitude of its corresponding emitter circuit resistance. Since those emitter circuit resistors have binary coded weightings, the total collector current provided by the four transistors has a magnitude which is an analog representation of the coded information presented at the base electrode of the four transistors. However, because of the nature of the conversion the analog form is Gray coded. The combined collector current is coupled on a lead 22 from the converter 17 to a low-pass filter 23. This filter is employed to eliminate frequencies beyond the 3000 cycles per second upper limit of the raised cosine spectrum in order to prevent difficulty from the problem of hold-over distortion in the vestigial sideband system utilized. A regulated bias source and connections, not shown, cause the circuit of FIG. 5 to produce positive currents for half of the 16 levels and negative currents for the other half.

A master clock and scaler circuit 26 provides the various time base signals which are utilized in the data transmitter terminal of FIG. 4. Thus, data bit timing is provided on a circuit 27 for synchronization of the binary coded data received from subscriber station 1; and this same timing is also supplied to the symbol encoder 13 for utilization in the converting operations of the circuit 16 included therein, as is well known in the art. In addition, the master clock and scalers 26 supply symbol timing on a circuit 28 to the encoder 13. The 2400 cycle carrier frequency is supplied on a circuit 29 to a modulator 30, which also receives the output of the low-pass filter 23 for modulation. The modulator 30 can be of any type known in the art which is adapted to suppress the carrier from the output signal. The upper sideband of the modulated signal from modulator 30 is partially removed by the band shaping function of a vestigial sideband filter 31. In accordance with a band shaping technique known in the art, the filter 31 and a similar filter located in the data receiver terminal 6 each perform approximately half of the band shaping which is required to achieve the raised cosine spectrum illustrated in FIG. 2. This filtering procedure is known to yield optimum signal-to-noise performance for average power limited channels. The master clock and scalers 26 also generate the pilot frequency waves which are utilized in the transmitted signals of the present invention, and these pilots are coupled by a circuit 32 to be combined in the output of the band shaping filter 31 with the modulated multilevel data signal. The pilot frequencies advantageously incorporated in the illustrative embodiment of the invention are 600 cycles per second and 3000 cycles per second, i.e., the two frequencies at the opposite ends of the raised cosine spectrum of the vestigial sideband modulated data signal.

Special start-up circuits, not shown, are arranged to provide on the circuit 22, at the beginning of an interval of connection through a particular carrier system circuit path, certain predetermined signals which are utilized by the receiver terminal 6 for start-up. Such start-up signals are used to initialize the receiver terminal circuits, as will be described in greater detail subsequently. The start-up signal in the illustrative embodiment includes an interval of steady carrier frequency wave followed by an interval of well separated pulses, each having a predetermined standard configuration. Pilot frequencies are included in both start-up and data signals. The standard pulses are then followed by data signals, and the beginning of such data signals includes framing pulses at a predetermined rate which is much lower than the symbol rate for utilization by error control circuits, which are not shown in the transmitter terminal 3 of FIG. 4. The error control circuits may, however, be of any desired known type which is suitable for producing the error control function desired for a particular application. Following the error control data framing pulses, data from the subscriber station 1 is received into the data transmitter terminal 3 and prepared for transmission to the data receiver terminal 6 via the aforementioned telephone utility carrier system. The master clock and scalers 26 also provide other data terminal control functions not fully described here which are known to be required in such a terminal.

*Receiver terminal*

Figure 6:
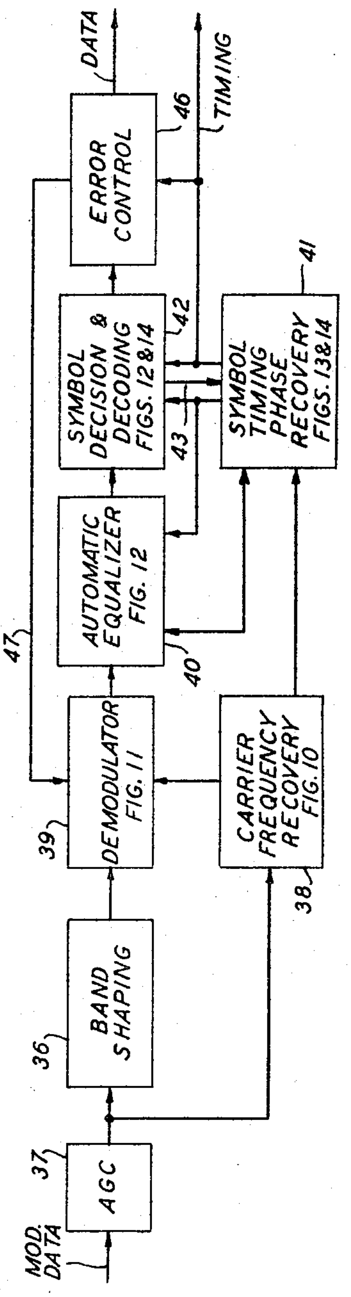
FIG. 6 is a more detailed block and line diagram of the data receiver terminal of FIG. 1.
Figure 7A:
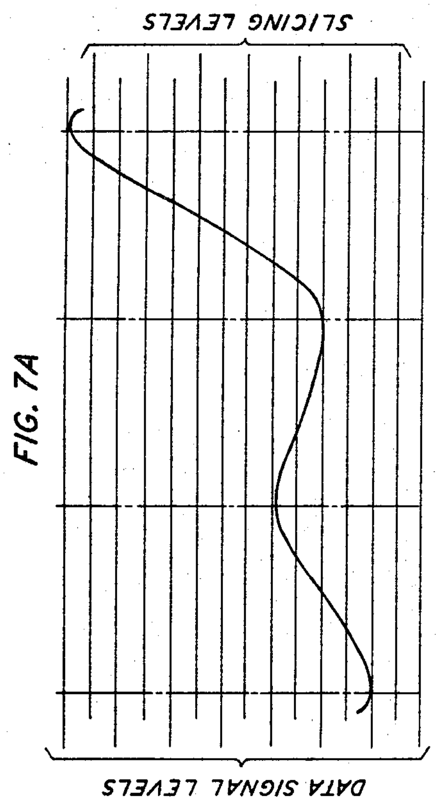
FIG. 7A is a portion of a typical multilevel data signal wave.
Figure 8:
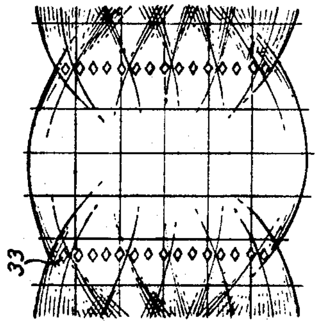
FIGS. 7 and 8 are data eye patterns illustrating the nature of the data signals which are utilized in the transmission system of the present invention.
Figure 7:
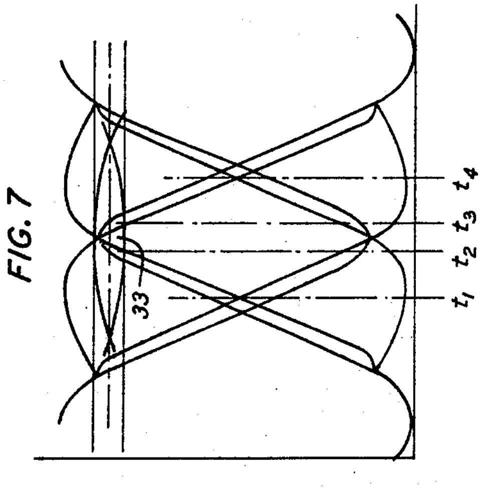

Before considering the functions performed in the data receiver terminal of FIG. 6, some of the difficulties of operating at high speeds with multilevel signals are to be reviewed in connection with FIGS. 7A, 7, and 8. It has been previously mentioned briefly that the static distortion characteristics of transmission circuits may differ from one circuit to another and, in fact, that they usually do. It has further been briefly mentioned that the dynamic distortion characteristics of any given circuit may vary from time to time. For example, in a carrier communication system which includes radio links, the radio links are subject to fading due to atmospheric conditions in certain of such carrier systems. Such fade conditions are in some systems detected before they become too serious, and the group of communication channels which is subject to the fading condition is switched to a different part of the carrier system spectrum which is not then subject to fade. However, in the process of such a switch, a minute part of the transmission may be lost so that any receiving terminal circuits which depend upon phase synchronization may lose any phase synchronization which they had theretofore acquired.

FIG. 7A is a trace of a several-symbol portion of a multilevel data signal superimposed on a grid of timing and amplitude intervals. Each vertical line represents an ideal symbol sampling time. Horizontal lines extending beyond the trace to the left are information-determinant data signal levels and 8 are shown. Similar lines extending beyond the trace to the right are slicing levels and 7 are shown, a zero slicing level and 3 each positive and negative levels. It is apparent that small amplitude or phase changes can easily cause errors by displacing a part of the trace with respect to the amplitude-timing grid.

FIGS. 7 and 8 represent synchronously superimposed traces of successive data signal segments which form characteristic eye patterns as known in the art. In such patterns the information-determinant portion of the signal is momentarily at a meaningful level in the eye so that the signal may be sampled at the eye to obtain sampling information that can be decoded to derive the original level coded data. In FIG. 7 there is shown a greatly simplified eye pattern for a conventional two level, i.e., binary, data signal. Superimposed thereon, but not to scale, is a single eye of an eye pattern from a sixteen level data signal. The small, rather triangular section 33 of the superimposed pattern represents the only portion of the sixteen level eye which can be utilized because of the large number of signal transitions on widely different amplitude levels. From a time standpoint the two-level binary eye extends from the time $t_1$ to the time $t_4$ in FIG. 7, and the single sixteen-level eye extends between the times $t_2$ and $t_3$.

FIG. 8 shows the eye pattern for two symbol intervals of a sixteen-level data signal of the type which is involved in the circuits of the present invention as herein described. The total time span of the two symbol intervals includes $\frac{1}{1200}$ of a second, and the total time span of a single symbol intervals covers only $\frac{1}{2400}$ of a second. One should notice, for example, with respect to the single eye 33 which is also illustrated in enlarged form in FIG. 7, the relative magnitude of the eye from a time standpoint as compared to the entire symbol interval and from an amplitude standpoint as compared to the total potential amplitude swing of the full data signal. In the receiving data terminal of FIG. 6 the data sampling is done within the eye; and each of the fifteen different amplitude slicing levels, one for each of the fifteen eyes in a particular symbol interval, is at approximately the center of the eye.

The eye pattern of FIG. 8 was observed for transmission under excellent transmission conditions. Thus, it can be seen that any lingering distortion in a data signal at the time of decoding can very easily shift the signal trace position with respect to the eyes in the eye pattern to cause the eye to be either partially or completely closed. Similarly, any small phase jitter in the sampling time for detecting signal samples in the eye can cause the eye to be completely missed. The circuits of the data receiver terminal in FIG. 6 are adapted to operate accurately with respect to sixteen-level data signals of the type illustrated in FIG. 8, but which are subject to factors of lingering distortion and possible phase jitter as previously indicated, but not illustrated, in FIG. 8.

Figures 9, 10:
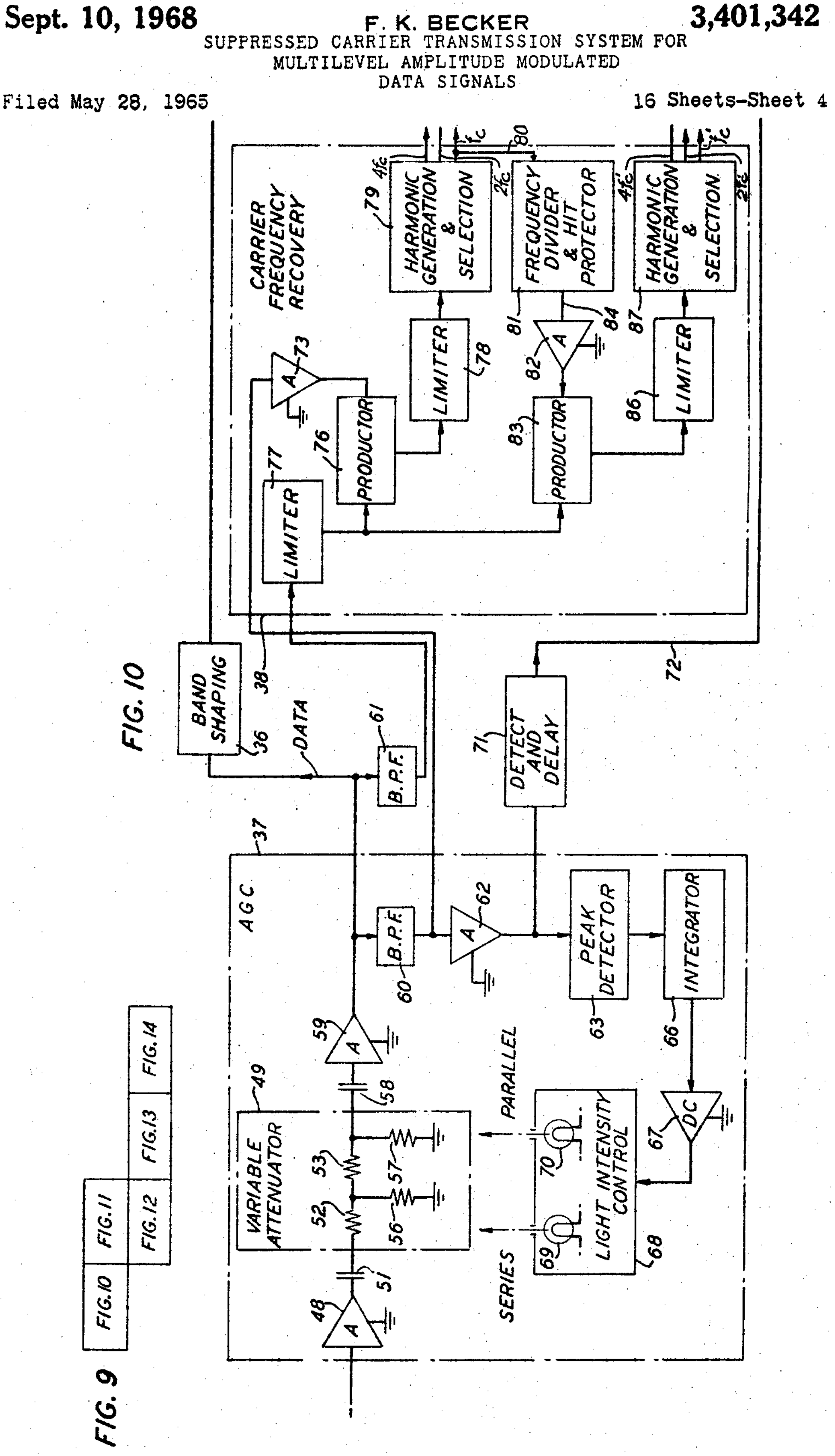
FIG. 9 is a diagram illustrating the manner in which the drawing sheets including FIGS. 10 through 14 may be assembled to form a composite detailed diagram in block and line form of the data receiver terminal shown in FIG. 6.

In FIG. 6 the modulated data signal is received from the carrier system receiving station and couple to an automatic gain control circuit 37 which is illustrated in somewhat greater detail in FIG. 10. A band shaping filter 36 is then utilized to supplement the filtering function of the band shaping filter 31 in FIG. 4 to produce the raised cosine modulated data spectrum shown in FIG. 2 as previously described herein. The automatic gain control is characterized by a unilateral feedback circuit. That is, it includes an arrangement for controlling the insertion gain in the circuit by nonelectrical means so that there is no direct interdependence between the data signal and the feedback signal. They are interrelated only insofar as the control characteristic is concerned. Furthermore, the insertion gain adjustment is performed so that distortion products generated within the band of interest are essentially negligible and need not be filtered. This is particularly important in systems, such as vestigial sideband, wherein the baseband and live signal band are close or overlap and filtering of distortion frequencies is not practical. Consequently, the gain control circuit 37 provides linear amplification over a wide range of different gain levels so that the incoming multilevel data signal is stabilized quite firmly.

It can be appreciated from the preceding discussion of

FIGS. 7A, 7, and 8 that if input signal variations should permit symbol amplitude to vary by an amount which is equal to one-half of the differential voltage between signal slicing levels for the multilevel data signal, the data signal thus distorted would be placed exactly on the slicing level and the resulting probability of error would be 50 percent. This, of course, would be unacceptable. More generally stated, the aforementioned unacceptable conditions would result if the input data signal amplitude were permitted to shift by an amount which was equal to $1/n-1$ times the maximum data signal amplitude for a signal having both positive and negative amplitudes. Thus, for the sixteen level signal $n$ is equal to sixteen, and the aforementioned disastrous condition of 50 percent errors at the highest signal level occurs if the signal is permitted to shift in amplitude by as much as one-fifteenth of the maximum controlled output signal amplitude. The automatic control circuit 37 with its particular unilateral feedback coupling arrangement for controlling gain is adapted to maintain input signal amplitude within a tolerance range which is much smaller than the aforementioned quantity. In one embodiment, which was actually operated, the automatic gain control was capable of holding the signal amplitude within plus or minus one-tenth of a decibel with an input signal variation of 40 decibels. Furthermore, the automatic gain control circuit accomplished this control while at the same time introducing distortion which was kept to a maximum of −58 decibels below the signal level.

The two pilot signals previously mentioned in connection with FIG. 4 are extracted from the output of automatic gain control circuit 37 and applied to a carrier frequency recovery circuit 38 which is illustrated in more detail in FIG. 10. The carrier recovery circuit 38 utilizes the two pilot signal waves to regenerate the timing wave of frequency $f_c$ which, in the illustrated embodiment, was 2400 cycles per second. The recovery circuit 38 also produces the carrier frequency $f'_c$, which is the sum of the carrier frequency $f_c$ and any carrier offset frequency $\Delta f$ which may have been injected during transmission between the carrier system transmitter 7 and receiver 8 in FIG. 1. Also produced in the recovery circuit 38 are waves at predetermnied harmonics of frequencies $f_c$ and $f'_c$. Those waves and their respective harmonics are utilized in the receiving terminal in a manner which will be hereinafter described.

Figure 11:
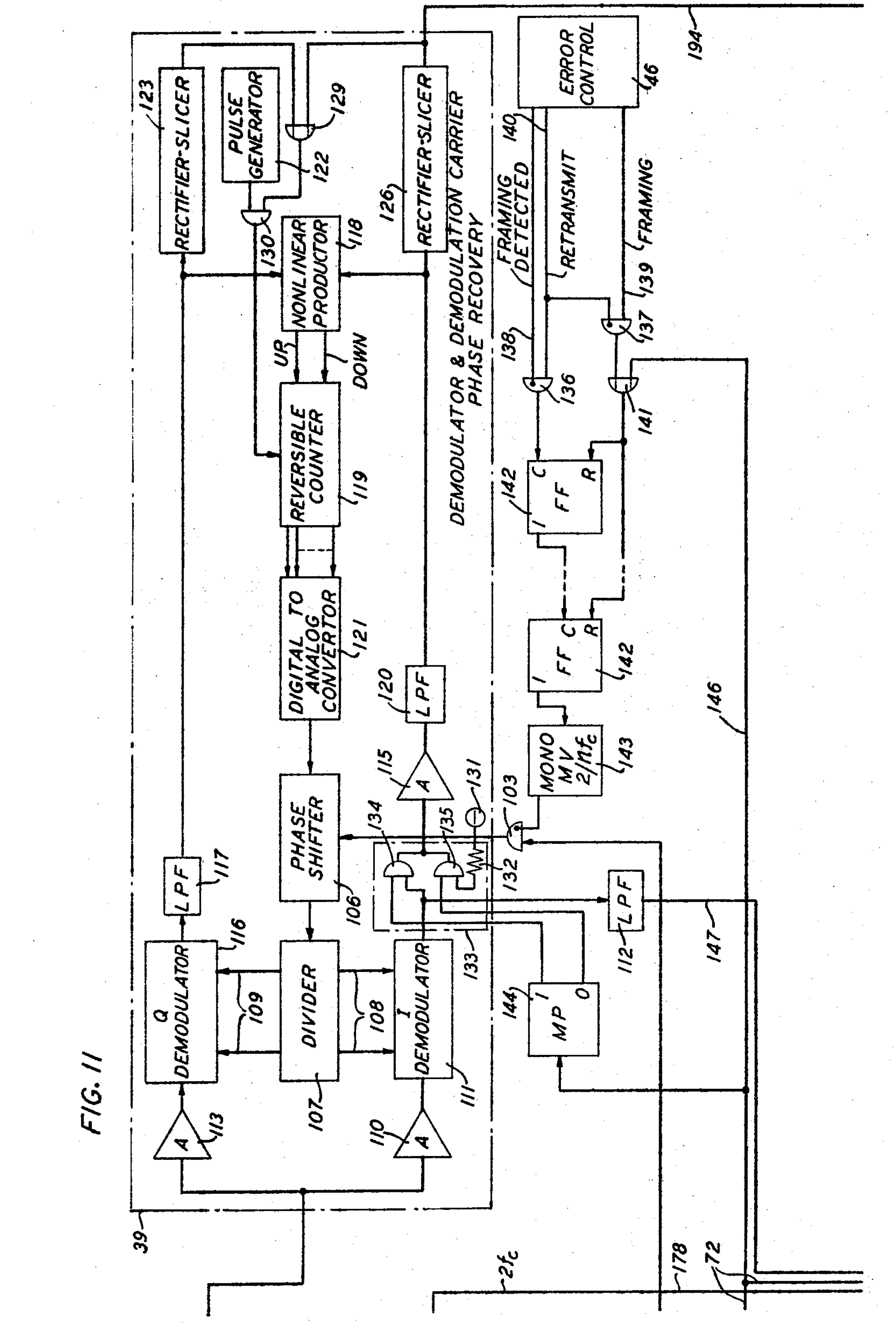

A demodulator 39, which is shown in greater detail in FIG. 11, receives the output of the band shaping filter 36 and a harmonic $nf_c$ of the carrier frequency from the carrier recovery circuit 38. In the illustrative embodiment the harmonic is 9600 cycles per second. The demodulator utilized in FIG. 6, and shown in block and line diagram form in FIG. 11, is the demodulator disclosed and claimed in the copending application of F. K. Becker and L. N. Holzman entitled "Demodulator Local Frequency Phase Control Circuits" and designated application Ser. No. 459,555 which was filed on May 28, 1965.

The demodulator 39 utilizes the carrier harmonic to obtain the carrier frequency in a manner which causes the resulting carrier frequency wave to be exactly symmetrical. In addition, certain of the demodulator output energy components with frequencies well below the carrier frequency are utilized to control the phase of the carrier frequency used in demodulation with respect to the incoming data signal phase. The demodulator output energy components are also utilized to minimize any demodulator carrier phase ambiguity conditions which may occur. That is, the demodulator has provisions to avoid phase lockup of the recovered carrier in a condition which is 180 degrees out of phase with the signal, rather than being in phase with the signal. The particular low frequency energy components are direct-current and other low frequencies ranging up to about 25 cycles per second.

The steady carrier frequency, which is transmitted as previously described during the start-up interval of transmission on a particular circuit connection, is utilized in the demodulator 39 to establish the correct and unambiguous phase relationship for the demodulator operation with the modulated data. Thereafter the demodulator tracks the variations in the phase of the signal and produces from time to time corresponding corrections in the phase of the recovered carrier frequency.

An automatic equalizer 40 receives the demodulated multilevel data signal from demodulator 39 and compensates such signal for the static distortion characteristics of the transmission circuit being utilized between the data terminals 3 and 6 of FIG. 1. This equalizer is advantageously the automatic equalizer disclosed and claimed in the aforementioned copending Becker et al. equalizer application. The equalizer utilizes the standard pulses transmitted during the start-up interval for transmission over a particular transmission circuit to determine the impulse response of such circuit and adapt itself to provide appropriate compensation for equalizing signals transmitted thereover. During this start-up procedure for initializing the automatic equalizer, such equalizer cooperates with a symbol timing phase recovery circuit 41 which derives an advantageous timing wave phase relationship for the data decoding operation. The cooperation between the equalizer 40 and the symbol phase recovery circuits 41 enable both circuits to accomplish their respective initialization functions accurately and rapidly. In fact, considerably more rapidly than would be the case if they were independently operated.

The symbol phase recovery circuits 41 advantageously utilize a different phase recovery scheme than the one employed in the demodulator 39. The reason for this difference is that in the demodulation process a simple phase agreement is adequate to reproduce the multilevel data signal. However, on occasion, there may be lingering distortion in the multilevel signal even after the signal has passed through the automatic equalizer 40, and this distortion can easily shift the optimum sampling position in the data eye as previously discussed in connection with FIGS. 7 and 8. Accordingly, the symbol phase recovery circuit 41 adjusts the phase of the recovered carrier frequency portion which it utilizes in accordance with certain characteristic signal incursions upon predetermined reference amplitude levels.

Figure 13:
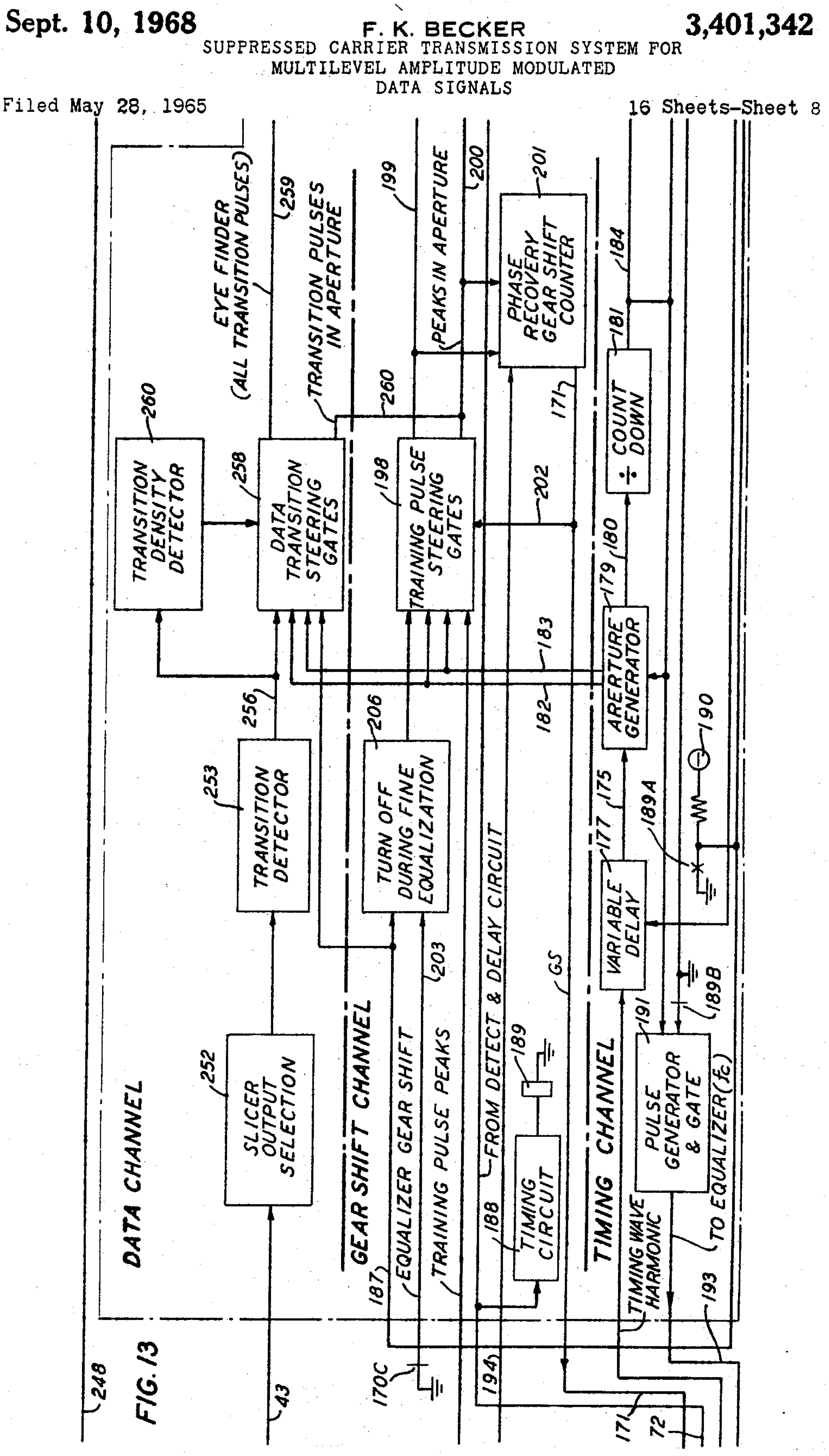
Figure 14:
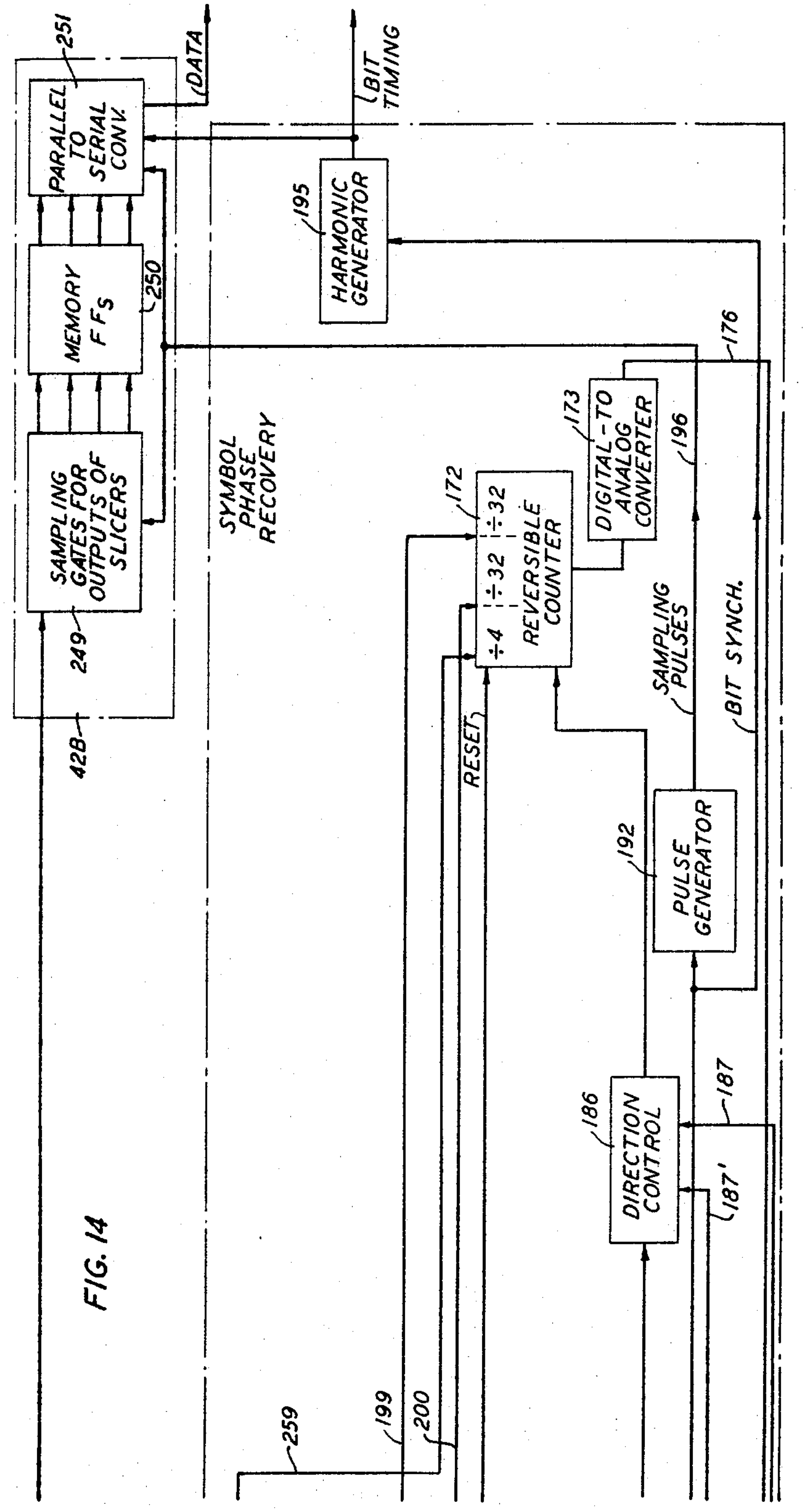

In one embodiment the timing phase recovery circuits advantageously employed were those shown in more detail in FIGS. 13 and 14. Such circuits are disclosed and claimed in the copending patent aplication of F. K. Becker and F. W. Lescinsky, Ser. No. 459,589, filed May 28, 1965, and entitled "Timing Phase Recovery System." During start-up operations the symbol timing phase recovery circuits 41 respond to the peaks of the standard pulses applied from the transmitting terminal 3 and adjust the timing wave phase toward phase coincidence with those standard pulses. Thereafter during data transmission the symbol phase recovery circuits 41 receive signals from the symbol decision and decoding circuits 42 on a circuit 43 which signals indicate the transition of the multilevel data signal through the predetermined signal slicing levels which are utilized to discriminate among the various information-determinant levels of the data signal.

The phase recovery circuits 41 receive from the carrier frequency recovery circuits 38 the second harmonic at 4800 cycles per second of the recovered timing wave frequency $f_c$ without carrier offset. This harmonic is utilized to supply the 2400 cycles per second carrier timing to the equalizer 40 and to the symbol decision and decoding circuits 42. In addition, the phase recovery circuits 41 produce from the phase adjusted timing wave a further harmonic thereof at the bit rate of the data and this harmonic, i.e., 9600 cycles per second, is supplied as bit timing to error control circuits 46 or to the subscriber station 2.

Symbol decision and decoding circuits 42 are shown in somewhat greater detail in block and line form in FIGS.

12 and 14. These circuits utilize a rectification scheme for performing multiple signal folding operations which facilitate the operation of slicers to produce signal impulses in response to signal transitions through each of the fifteen slicing levels for the sixteen-level data signal. The resulting slicer output transitions are utilized as previously mentioned in the symbol phase recovery circuits 41. Certain of the slicer output signals defined by such transitions are utilized to operate circuits for deriving the binary coded signals from the level coded format as will be described in connection with FIG. 14.

The error control circuits 46 are advantageously any known error control circuits which are capable of correcting a predetermined number of detected data errors and for providing a signal which calls for retransmission of a data block if more than such predetermined number of errors are detected. These circuits 46 respond to the previously mentioned framing pulses produced by the transmitter circuits of FIG. 4 to acquire framing synchronization for error control purposes in a manner well known in the art. In accordance with the present invention, the error control circuits 45 provide signals on a circuit 47 to the demodulator 39 to indicate the occurrence of a predetermined plurality of successive requests for data retransmission, as a result of the detection of excessive errors. These signals are operative in the demodulator for causing a reversal of the phase of the carrier frequency in response to such an event to determine on the next retransmission whether or not the errors may possibly have been due to a previous spurious phase inversion as between incoming data signals and recovered carrier.

FIG. 9 includes a diagram illustrating the manner in which the FIGS. 10 through 14 may be combined to form a composite diagram showing details of the arrangement and operation of the receiver terminal described in connection with FIG. 6. Throughout the FIGS. 10 through 14 reference characters for circuit items previously discussed are carried through in identical fashion.

*Automatic gain control*

In FIG. 10 the automatic gain control circuit 37 is illustrated in more detail in one form which is advantageously employed to provide the needed wide range of gain control in a linear and yet noise free fashion. The modulated multilevel data signals are received from the carrier system receiver 8 and applied to the input of a linear amplifier 48. The amplifier 48 has feedback-stabilized gain in order to provide improved linearity. It also is adapted to have a low output impedance to be presented to a variable attenuator 49 which is coupled thereto by a coupling capacitor 51. Attenuator 49 includes two L-section resistor pads which include the series resistors 52 and 53 and two shunt-connected resistors 56 and 57. These resistors are the type known in the art which display a resistance characteristic which is linearly variable in accordance with the intensity of resistor illumination. Thus, the attenuation presented by the two resistive pads is conveniently variable through a wide range while remaining a linear bilateral circuit element that characterizes such resistors. Also there is no restriction upon the magnitude of the resistive variation control signal as is sometimes the case in prior art bilateral automatic control circuits wherein the input and control signals are physically of the same type and the magnitude of the control signal must at all times be greater than the input signal.

A coupling capacitor 58 couples the output from variable attenuator 49 to a high input impedance amplifier 59. The latter amplifier has the characteristics of a power amplifier and also provides a proper terminating impedance for presentation to the bandpass filters 60 and 61, which are coupled to its output. The total gain of amplifiers 48 and 59 can be divided between the two in any convenient proportion. The output of amplifier 59 is also coupled to the input of the band shaping filter 36.

A bandpass filter 60 is adapted to pass the low frequency pilot signal which is included in the incoming data signal. In this case that pilot is at 600 cycles per second. The output of filter 60 is coupled through an additional amplifier 62 which provides further locally stabilized gain and also acts as a low impedance source for a peak detector 63 which is coupled to the output of amplifier 62. Signal peaks of the 600-cycle pilot frequency are integrated by the integrating circuit 66 to produce a direct-current control signal having a long time average value which is indicative of the desired long time average amplitude desired for the 600-cycle pilot frequency. The output of integrator 66 is coupled to a direct-current amplifier 67 which is advantageously arranged in the form of a differential amplifier in order to provide maximum common mode signal rejection.

The output of amplifier 67 is coupled to a control circuit 68 which includes two sources of illumination schematically represented by the light bulbs 69 and 70. The bulb 69 illuminates the series resistors 52 and 53 in attenuator 49, and the bulb 70 illuminates the shunt connected resistors 56 and 57. The control circuit, not shown, for the illumination sources 69 and 70 is also arranged in the form of a differential circuit so that the energization of one lamp, and therfore its luminous intensity, is increased when the energization of the other lamp is decreased, and vice versa. Thus, a change in the amplitude of the control signal supplied by amplifier 67 causes the resistances of the series resistance elements in attenuator 49 to change in one direction and the resistances of the shunt connected elements to change in the opposite direction.

The automatic gain control circuit 37 thus includes two linear gain stabilized amplifiers 48 and 59 in the through signal transmission path for the modulated data signals. These two amplification elements are coupled together by means of the variable attenuator 49 so that the total insertion gain of the amplifiers plus attenuator may be adjusted without altering the amplification characteristics of the amplifiers. In this fashion a wide range of insertion gain is possible without significantly affecting the linearity of the amplified signal and the entire operation is conducted in an essentially noise free fashion.

The 600-cycle pilot frequency in the output of amplifier 62 is further coupled to a detect and delay circuit 71 which may take any suitable form and which is adapted to provide certain initialization control functions in the receiver terminal. In particular, the circuit produces a direct current output signal in response to the appearance of the 600-cycle pilot frequency. This control signal is coupled by a lead 72 through the drawings of FIGS. 11 and 12 to the input of the symbol phase recovery circuit 41 in FIGS. 13 and 14. The utilization of that signal will be hereinafter discussed in greater detail. However, detect and delay circuit 71 also includes a delay element, as its name implies, which is adapted to maintain the aforementioned direct current output control signal for a predetermined suitable time. For example, a two second delay is advantageously utilized in order that the receiver initialization functions which are triggered by such control signal in the symbol phase recovery circuits will not be reinitiated in the event of a momentary loss of the 600-cycle pilot frequency. Such a pilot loss might occur in the event of a temporary failure of the operation at the transmitting terminal, or the more likely event of a momentary interruption in the carrier signal communication path, as previously mentioned, may occur in radio systems with standby channels.

*Carrier frequency recovery*

The output of bandpass filter 61 includes primarily the high frequency pilot wave at 3000 cycles per second. This pilot, together with the low frequency pilot from the bandpass filter 60, are coupled to the carrier frequency recovery circuits 38 for the derivation of the carrier and timing wave frequencies and harmonics as hereinbefore outlined. The 600-cycle pilot is coupled from filter 60 through an amplifier 73 to one input of a productor 76. The output of filter 61 is coupled to another input of the same productor through a limiter circuit 77. Inasmuch as the two pilot frequencies are at opposite ends of the raised cosine spectrum of the data transmission system, and since the automatic gain control circuit 37 operates in response to the low frequency pilot, it cannot be necessarily guaranteed that the 3000-cycle pilot at the upper end of the spectrum will have the desired amplitude for utilization in the productor 76. The relative amplitude of all signals other than the low frequency pilot are determined by the carrier system transmission characteristics. Accordingly, the output of filter 61 is coupled through the limiter 77 which is advantageously a feedback limiting amplifier adapted to maintain in its output a fairly uniform signal amplitude level in spite of input variations in the pilot frequency amplitude.

Productor 76 is a balanced modulator type of circuit which is operated in the manner of a switching modulator in response to the 600-cycle and 3000-cycle input signal waves. The 3000-cycle pilot in the output of limiter 77 is essentially a square wave and is, therefore, utilized as a switching control signal for the productor 76. The output of the productor, as is well known in the art, includes primarily the sum and difference frequencies of 2400 and 3600 cycles per second. The lower frequency is selectively amplified and limited in another amplifier-limiter circuit 78 in order to square up the waveform thereof and then coupled to a harmonic generation and selection circuit 79. In the latter circuit the 2400-cycle per second timing wave which, incidentally, includes none of the carrier offset frequency $\Delta f$ which was lost in the operation in productor 76, is utilized to generate certain predetermined timing frequency harmonics. In this particular case those harmonics are the second and fourth so that the circuit 79 includes in separate output connections the frequencies $f_c$, $2f_c$, and $4f_c$, as indicated by correspondingly designated leads in FIG. 10. Only the fundamental and second harmonics are employed in the data terminal portions herein illustrated. Any suitable harmonic generation and selection circuits, many of which are known in the art, may be utilized in the circuits 79.

Figures 10A, 11A, 11B:
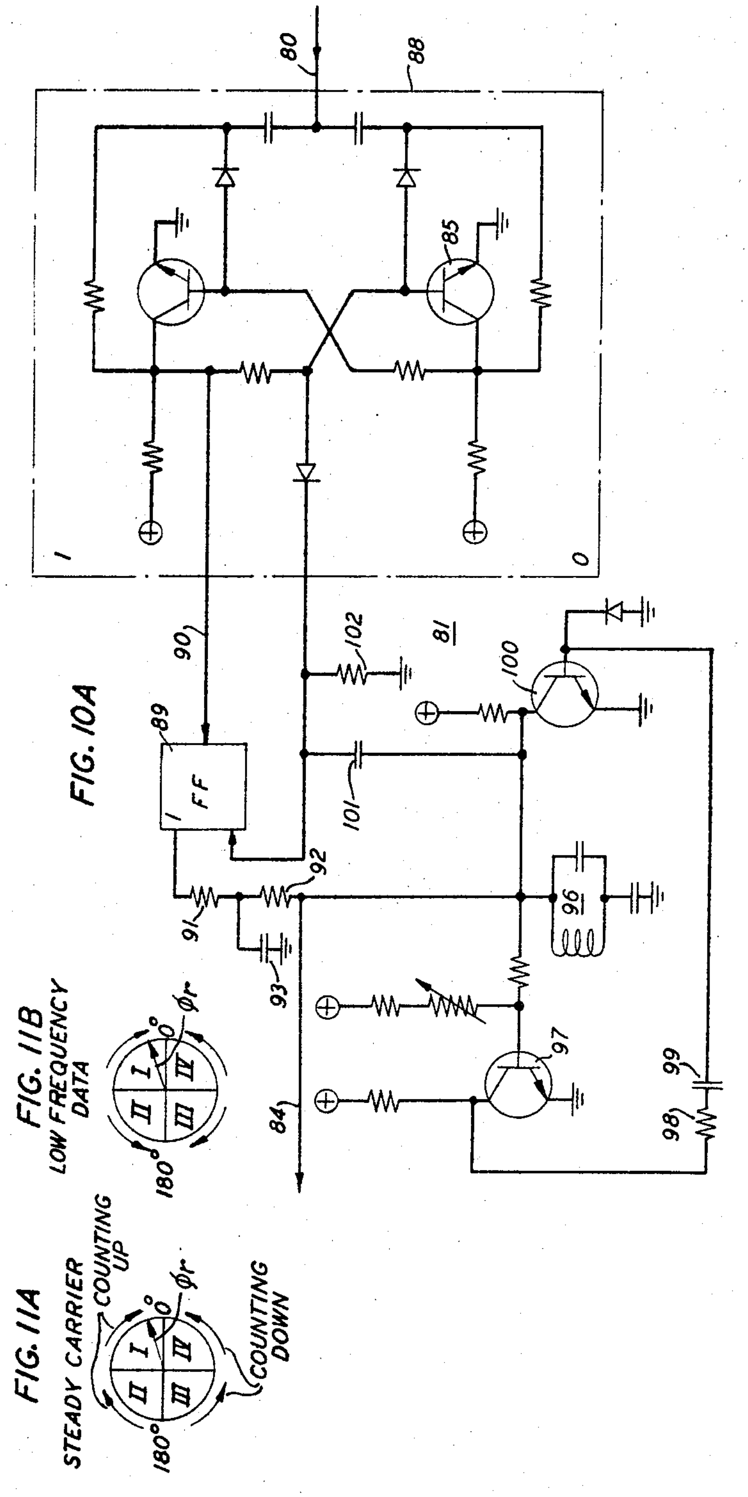
FIG. 10A shows the details of a frequency divider and hit protector circuit shown in FIG. 10.
FIGS. 11A and 11B are circle phase diagrams illustrating certain carrier phase recovery aspects of the demodulator illustrated in FIG. 11.

A circuit 80 is provided to couple the $f_c$ timing frequency output from the circuit 79 to a frequency dividing and hit protector circuit 81. The latter circuit is adapted to divide down the carrier frequency to obtain therefrom the low frequency pilot signal of 600 cycles per second with no carrier offset frequency $\Delta f$. Details of the frequency divider and hit protector circuit 81 are shown in FIG. 10A and will hereinafter be described. The 600-cycle derived pilot signal is coupled through a further amplifier circuit 82 to one input of a productor 83. The productor 83 is of the same type as the productor 76 and receives at its other input connection the output of the limiter 77. Thus, productor 83 is combining the 3000-cycle pilot, which has the carrier offset frequency $\Delta f$, with the 600-cycle pilot, without the carrier offset. The productor output as a result of these two input signals comprises the 2400-cycle per second carrier frequency with the carrier offset frequency $\Delta f$, and the sum of these two is hereinafter designated the carried frequency $f_c'$. The carrier frequency $f_c'$ is coupled through another selective limiter 86 which is of the same type as the limiter 78 to another harmonic generation and selection circuit 87, which is also of the same type as the similar circuit 79 previously mentioned. Circuit 87 also includes three output connections at which appear the carrier frequency $f_c'$ and its second and fourth harmonics $2f_c'$ and $4f_c'$, as indicated in FIG. 10. Only the fourth harmonic is utilized in the terminal circuits illustrated herein.

In FIG. 10A the frequency divider and hit protector circuit 81 is shown in detail. It is also disclosed and claimed in the copending application of F. K. Becker-C. W. Farrow designated Ser. No. 459,810 filed May 28, 1965, and entitled "Phase Stable Frequency Divider." The circuit 81 comprises a two-stage binary counter which includes the bistable, or flip-flop, circuits 88 and 89, which are arranged to count pulses of a predetermined polarity from the output of the harmonic circuit 79. The flip-flop circuit 88 receives the carrier frequency $f_c$ on the lead 80 by means of a complementing type of input connection so that the flip-flop circuit 88 is triggered in response to every negative pulse in the carrier frequency wave. The binary ONE output of flip-flop circuit 88 is coupled by a lead 90 to the complementing input connection of the similar flip-flop circuit 89. The binary ONE output of that flip-flop circuit is, in turn, coupled through a phase shifting circuit including resistors 91 and 92 and a shunt-connected capacitor 93 to the output lead 84 previously identified in connection with FIG. 10.

The lead 84 is also coulped to a tank circuit 96 which is arranged to have a resonant frequency at the low frequency pilot level of 600 cycles per second. Tank circuit 96 is included in an oscillatory circuit arrangement wherein the signal across the tank is coupled to the input of a first common emitter amplifier stage 97, which drives through a coupling network including a series-connected resistor 98 and capacitor 99 to another common emitter amplifier stage including a transistor 100. The collector electrode output of transistor 100 is further coupled back to the tank circuit 96 to provide a closed oscillatory loop with appropriate gain to sustain oscillations at the resonant frequency of 600 cycles per second. The collector electrode output of transistor 100 is laso coupled through a differentiating circuit including a capacitor 101 and a resistor 102 to the reset input connections of the two flip-flop circuits 88 and 89.

The differentiated impulses thus provided reset the binary counter stages if those stages are not already in the reset condition when such pulses appear. Under proper operating conditions the phase shift injected by the phase shifting elements 91 through 93 is adapted so that the negative-going differentiated impulses coupled from capacitor 101 to the flip-flop stages 88 and 89 ideally arrive at times when the corresponding flip-flop circuit transistors 85 are in the nonconducting condition. In that state the differentiated impulses have no effect upon the binary counter operation. However, if the transistors are in a conducting condition, an erroneous state of operation of the binary counter is indicated; and such negative differentiated impulses reset both stages of the counter and thereby establish a desired phase condition for the recovered 600-cycle carrier frequency.

It is well known that in countdown circuits radio frequency interference, or hits, transmitted in the atmosphere can cause the state of one or more stages of the counter circuit to change in a spurious manner. Such a change of course, effects a change in the phase of the recovered 600-cycle wave which can adversely affect the operation of phase-sensitive receiver circuits that have been hereinbefore mentioned. However, in the circuit of FIG. 10 the oscillator which is tuned to 600 cycles does not readily respond to the aforementioned spurious hits. Accordingly, if its output phase differs from the correct phase of the counter stage transistors, the differentiated impulses from capacitor 101 reset the counter stages to the desired condition, thereby restoring a proper phase relationship in the recovered carrier frequency promptly and before any substantial disruption of receiver operation can occur.

*Demodulator*

The demodulator circuit in FIG. 11 receives the modulated multilevel data signal from the output of the band shaping filter 36 in FIG. 10. The demodulator also receives a carrier frequency harmonic of 9600 cycles per second from the $4f_c'$ output of the carrier recovery circuit 38 in FIG. 10. This carrier harmonic is coupled through a coincidence gate 103 to the input of a phase shifter 106. The phase shifter controls the phase of the recovered carrier signal in relation to the incoming data signal in a manner which will be hereinafter described. The 9600-cycle per second signal from the phase shifter 106 is applied to a frequency divider and phase shifter circuit 107 which is advantageously a two stage re-entrant shift register of the type shown in detail in the aforementioned Becker et al. demodulator application.

The significant characteristic of the output of the divider 107 is that it provides a first two rail output at the carrier frequency $f_c'$ of 2400 cycles per second on the leads 108 which are herein considered the in-phase carrier signal leads. The divider also provides on a pair of leads 109 another carrier frequency signal of the same frequency but in quadrature phase relationship thereto. The re-entrant shift register holds the quadrature phase relationship between the two derived carrier frequency waves exactly. In addition, the divider is characterized by producing such waves in precise square waveforms so that each positive-going half cycle is exactly the same as each negative-going half cycle in duration. It is essential that the carrier wave be symmetrical in order that the carrier frequency signal should not inject any undesired signals into a demodulator output as is well understood in the art.

The modulated data from the automatic gain control circuit 37 is applied through an isolation amplifier 110 to the input of an I demodulator 111. This demodulator receives the recovered carrier frequency wave on the circuit 108 and that carrier must be adjusted to be in phase with the data signal. The output of demodulator 111 is coupled through a low-pass filter 112 to the input of the adjustable equalizer 40 in FIG. 12. Filter 112 is adapted to suppress the transmission of demodulator output products having frequencies which are above 1800 cycles per second as shown in FIG. 3.

The output from the band shaping filter 36 is also coupled through another amplifier 113 to the input of a Q demodulator 116. The two demodulators 111 and 116 are balanced modulators operated under the control of square wave carrier frequency signals to function as switch demodulators in a manner which is known in the art. There are only two significant differences between the two circuits. Thus, the Q demodulator receives the quadrature carrier signal on the circuit 109 and operates as a quadrature demodulator. The demodulator 111 receives the in-phase carrier signal on circuits 108 and is therefore considered the in-phase demodulator. In addition, the in-phase demodulator 111 includes an extra phase inversion which is not included in the demodulator 116, but such inversion is of no importance to the principle of operation of the circuit. It is included to offset an extra inversion in another one of the receiver terminal circuits and is relevant in the demodulator only in that it affects the polarity of a reference signal to be described. The low frequency energy components of both of the demodulators 111 and 116 are utilized to control the phase of the carrier harmonic by providing a control signal to the phase shifter 106.

In a suppressed carrier transmission system, the data signal normally does not include the carrier frequency component. However, there are in the random data signal wave occasional intervals when successive symbols have similar magnitudes and the in-phase demodulation output has some very low frequency components. The output of the in-phase demodulator includes a strong direct current component when receiving carrier as a line signal. It normally has no direct current output component as long as it is not receiving carrier frequency in the line signal, but it does have low frequency output components near zero when receiving a data signal with an interval of successive similar symbols. This assumes, of course, that the locally recovered carrier is properly phased with respect to the data signal.

On the other hand, the Q demodulator 116 under the same conditions of properly phased local carrier presents essentially no direct current or low frequency output for either carrier or data with successive similar symbols. Being a quadrature demodulator it produces no output unless there is a phase discrepancy between the carrier and the data.

If carrier frequency is present in the line signal input to the demodulators, but it is out of phase with respect to the local carrier, then both of the demodulators produce an output direct-current component. A similar situation results if data is being received and is out of phase with respect to the local carrier when the data includes very low frequencies. The direct-current components in either case are of opposite polarities as a result of the aforementioned I demodulator phase inversion. All of the previously described demodulator signal relationships are hereinafter utilized in the circuits to be described for controlling the phase of the recovered carrier for demodulation purposes.

A low-pass filter 117 couples the output of the quadrature demodulator 116 to one inuput of a nonlinear productor 118. An additional isolation amplifier 115 and another low-pass filter 120 couple the output of the in-phase demodulator 111 to a second inuput of the nonlinear productor 118. The low-pass filters 117 and 120 are adapted to pass direct current and also the adjacent low frequencies which can be produced in the demodulator outputs in response to data symbol sequences which are of similar amplitude, i.e., which vary from symbol to symbol through only a relatively small number of adjacent information determinant amplitude levels. Thus, the filters 117 and 120 advantageously have a cutoff frequency in the illustrative embodiment of about 25 cycles per second.

Productor 118 is a logical EXCLUSIVE OR type of circuit which responds to the polarities of its two input signals for producing one or the other of two output signals. The inputs may be either alternating current or direct current. If the input signal polarities to the nonlinear productor of FIG. 11 are the same, the producer produces an output which is applied to a two-rail circuit including leads UP and DN, and the signal is ground on UP and negative on DN. The leads are applied to the counting direction control input of a reversible binary counter 119. Similarly, if the two input signals to the productor 118 have different polarities, the productor provides a two-rail signal that makes lead UP negative and lead DN ground. The former condition causes the counter to count in one direction and the latter condition causes the counter 119 to count in the opposite direction.

Because of the polarity type of response of the nonlinear productor 118 it produces one type of output to indicate a leading phase relationship and another to indicate a lagging phase relationship. The two types of productor signal are always the same even though the incoming data signal may itself reflect inherent carrier phase reversal conditions which appear in the transmitter each time an information-determinant amplitude is selected which has a polarity that is opposite from the immediately preceding information-determinant amplitude polarity. That is because such phase reversals switch both input signal polarities to the productor at the same time.

A plurality of the most significant stages of counter 119 have their outputs coupled to a digital-to-analog converter 121 which develops a control signal for the phase shifter 106. In one embodiment which was operated, counter 119 had eleven binary counting stages and the nine most significant of those stages were applied to the converter 121. The two least significant stages were utilized for integrating the effects of noise. The converter 121 includes a separate common emitter amplifier stage for each of the inputs from the counter 119, and those stages have a combined collector impedance circuit which comprises a ladder impedance network through which all stages are connected to a common linear aplifier stage. The output of the latter stage is a direct-current control signal that is used to control the operation of the phase shifter 106.

Phase shifter 106 is advantageously a train of plural trigger circuits with voltage controllable triggering thresholds. The trigger circuits are connected in tandem by means of impedance delay circuits in the interstage coupling between stages. The aforementioned control signal from digital-to-analog converter 121 provides the threshold adjustment for all of the trigger circuits in common. Consequently, each of the 9600 cycles per second carrier harmonic pulses from the gate 103 to the phase shifter 106 is applied to the first of the plural trigger circuits and is propagated through the train of trigger circuits at a velocity which is a function of the magnitude of the common trigger circuit threshold. In other words, the delay circuits in the input of each trigger circuit build up the input voltage until the thresold of that trigger circuit is attained and the stage is triggered. This operation is repeated in succession through the phase shifter 106 until an output pulse is produced for application to the divider circuit 107.

Drive pulses for the reversible counter 119 are supplied from a pulse generator 122 under the control of the output signals from the two low-pass filters 117 and 120. The pulse repetition rate at the output of generator 122 is low compared to the signal symbol rate. Two rectifier slicer circuits 123 and 126, the details of which are not shown herein, couple the outputs of the low-pass filters to an OR gate 129. In each rectifier slicer a differential amplifier receives the input signal. The amplifier is arranged as a phase inverter and has an adjustable gain control which is adjusted to a level such that the signals supplied from the low-pass filters 117 and 120 must attain a predetermined magnitude before the differential amplifier is able to amplify them to a sufficient level to exceed the threshold of a full wave rectifier bridge. The total conducting threshold of the bridge diodes must be exceeded before an output is produced. Such output from the bridge rectifiers is the sliced output and is applied through the OR gate 129 for enabling AND gate 130.

When enabled, the gate 130 couples each output pulse from the pulse generator 122 to the input of reversible counter 119 for operating that counter in the direction indicated by the control signals from the nonlinear productor 118 as previously described. Consequently, counter 119 is driven at any time that the demodulator input includes carrier frequency signals or a train of data symbols with relatively small amplitude changes. Such input signals cause the low-pass filters 117 and 120 to include some output in excess of the threshold of the circuits 123 and 126.

Counter 119 is operated whenever the low-pass filter outputs, or either of them, has at least a predetermined minimum amplitude, and the manner of operation of the reversible counter is a function of the relative polarities of the outputs of those two low-pass filters. After any particular operation the counter 119 remains in its final condition and thus remembers its last condition. Consequently, the adjustment of phase shifter 106 remains fixed between the times that the counter 119 is operated to supervise the phase condition once more.

Phase shifter 106 and counter 119 are advantageously arranged so that they have a total phase control range of more than 360 electrical degrees for the divided carrier frequency signals which are produced on the circuits 108 and 109. In one embodiment actually operated the control range was about 400 degrees. If the control range were only 360°, and the input phase conditions dictated operation of the reversible counter around a condition corresponding to 360 electrical degrees of the carrier frequency, repeated large swings of the counter would occur and spurious carrier phase shifts occur each time. For example, if counter 119 were required to be completely reset each time a 365-degree phase shift were indicated, there would be repeated intervals of incorrect phase.

However, with the 400-degree control range the counter 119 can operate easily and rapidly back and forth around the 360-degree condition. Then if a further phase shift to the 400-degree level is indicated, the counter advances to the full count condition. When necessary, the counter spills over once to the reset condition and then advances to the equivalent 40-degree condition about which it oscillates as required without moving back and forth continuously between the counter extreme conditions.

The source 131 is assigned a negative potential because that is the potential that should appear in the output of the I demodulator 111 in response to the reception of the start-up steady carrier signal from the transmitting terminal. The steady carrier is, of course, in correct phase with respect to data at such terminal. Consequently, the output of low-pass filter 120 is forced to have the proper polarity for productor 118 and to be of adequate magnitude to initiate the supply of pulses from the generator 122 to reversible counter 119. The operation of the EXCLUSIVE OR productor 118 responds to the output of filter 120 in cooperation with the output of the filter 117 to operate counter 119 for forcing the phase of the recovered carrier harmonic which is applied to phase shifter 106 to be in the proper relationship with respect to the steady carrier. Thus, the local carrier will also be properly phased with respect to the data which will be received from the transmitting terminal after the start-up interval. If the proper phase relationship is attained before the end of the steady carrier interval, the productor 118 output signals cause counter 119 to hunt about the correct position until monopulser 144 has timed out as hereinbefore outlined.

Figure 15:
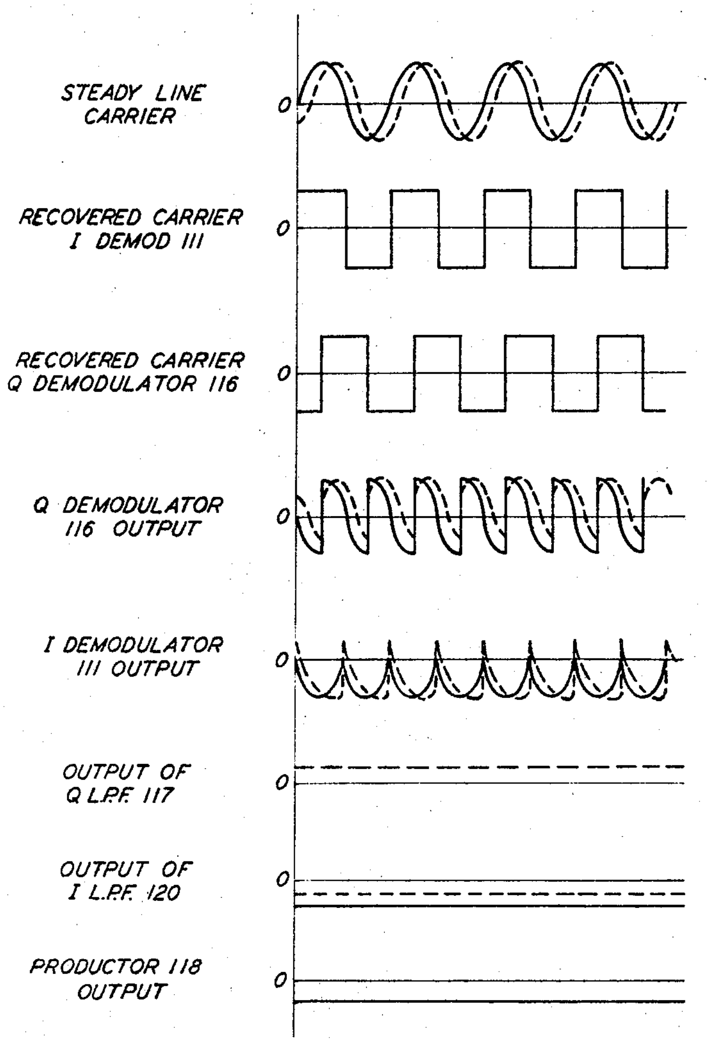
FIG. 15 is a family of timing diagrams illustrating certain operations of the demodulator in FIG. 11.

The importance of avoiding the 180-degree phase condition between the line signal input and the recovered carrier can be seen by reference to the FIG. 15. That figure includes a family of waveforms illustrating the operation of the demodulator in FIG. 11 during the start-up sequence. Solid-line waveforms represent the proper phase condition and broken-line waveforms an improper condition.

During the start-up operation for the receiving terminal a negative reference voltage source 131 is connected by means of a current-limiting resistor 132 and a selector switch 133 to the input of the amplifier 115 in lieu of having the output of in-phase demodulator 111 connected to such amplifier. Switch 133 includes a pair of coincidence gates 134 and 135 actuated by the binary "1" and "0" outputs of a monostable multivibrator 144 which is triggered in response to the output of the detect and delay circuit 71 shown in FIG. 10.

The detection of a pilot frequency signal in the output of the automatic gain control circuit 37 indicates the beginning of a start-up period for a new connection. Monopulser 144 is triggered and its binary ZERO output operates gate 135 to couple the source 131 to the input of amplifier 115 for the adjustment of demodulation carrier phase. The unstable time interval of the monopulser is adjusted to have approximately the same duration as the start-up interval of steady carrier and pilot. At the end of such interval monopulser 144 resets and its binary ONE output operates gate 134 to couple the input of amplifier 115 to the output of demodulator 111. An alternating current coupling circuit is of course used between the detect and delay circuit 71 and the input of such a multivibrator so that the continued presence of the direct-current control signal in the output of the circuit 71 is unable to accomplish further triggering of such multivibrator and thereby reinitiate the start-up operation in the demodulator 39.

It can be seen from FIG. 15 that if the phase of the recovered carrier applied to the I demodulator were 180 degrees out of phase from the condition illustrated in FIG. 15, the resultant wave in the output of the I demodulator would be a full wave rectified signal with positive rectified wave excursions instead of the negative excursions illustrated in FIG. 15. Such a reversal in a voice transmission system would probably not be detected in the ultimate output of the receiving terminal. However, for a receiving terminal which handles data transmissions, and in particular multilevel data transmissions of the type herein shown in FIG. 7A, the reversal accomplishes a reversal of the polarities of the information-determinant signal levels. Consequently, the Gray coded signal levels are jumbled, and the resulting data wave is converted into a train of meaningless pulses.

It is seen in FIG. 15 that the two versions of the recovered carrier which are supplied by the divider 107 to the demodulators 111 and 116 are in phase quadrature relationship. The output of the Q demodulator has substantially equal positive-going and negative-going portions so that the output of the Q low-pass filter for the in-phase carrier condition is zero. The I demodulator has an output train of substantially uniform negative-going signal excursions which appear in the output of the I low-pass filter as a negative direct-current voltage. The zero or ground voltage from filter 117 and the negative voltage from filter 120 cause productor 118 to produce an indeterminant, or hunting, output control voltage for driving counter 119, indicating a balanced condition. FIG. 11A is a phase error circle diagram that is divided into quadrants. The productor output is assumed to cause error angle vector rotation in the direction indicated by an arrow outside the quadrant. Thus, an output from the productor for phase angle errors $\varphi_r$ in the two upper quadrants will cause the counter 119 to count up in order to rotate the phase error vector clockwise toward the zero degree error position. Similarly, the productor output for phase angle errors in either of the two lower quadrants of the diagram in FIG. 11A will cause counter 119 to count down for rotating the error angle vector counterclockwise toward zero degree position.

The broken-line wave diagrams in FIG. 15 illustrate the condition in which the steady carrier received from the transmitting terminal as signal is out of phase with the recovered carrier locally generated in the receiving terminal. This shift in the relative phase between the received carrier and the recovered carrier represents a leading local carrier and causes the output of the Q demodulator to have positive-going excursions of greater extent than the negative-going excursions for the illustrated condition. Consequently, the output of the Q low-pass filter 117 is positive. For this same phase error between the local and line carriers the output of the I demodulator 111 now includes small positive-going cusps in addition to the negative-going wave portions. The average value of demodulator 111 output wave appears as a smaller negative direct-current voltage in the output of the I low-pass filter 120. The outputs of the two low-pass filters are thus of opposite polarity; productor 118 produces an output to cause counter 119 to count up in order to shift the phase angle error vector in a clockwise direction toward the zero phase error condition. In other words, when counter 119 is counting up it is reducing a lagging phase error in the local carrier.

In a similar fashion it will be understood that if the steady line carrier had a phase angle error $\varphi_r$ in the opposite direction from that illustrated in FIG. 14, the recovered carrier has a lagging phase relationship with respect to the line signal carrier applied to the I demodulator 111. The output of the Q demodulator is shifted in a fashion which results in its negative-going excursions being of greater extent than its positive-going excursions so that the output of the filter 117 is negative. Under these conditions the output of the I demodulator still has the positive-going cusps, but they do not cause a reversal in the polarity of the negative output voltage from the I low-pass filter 120. The outputs of both low-pass filters are, for the lagging phase error condition, of the same polarity. The productor 118 produces an output which causes counter 119 to count down and rotate the phase error angle in a counterclockwise direction toward the zero phase error condition.

The previously described condition of operation wherein the counter 119 counts up to reduce a leading local carrier phase error and counts down to reduce a lagging local carrier phase error also applies in much the same fashion for the reception of data. However, as previously noted, during the reception of data which is in the suppressed carrier form there is normally no carrier component continuously present when the data is changing in a random fashion. When the data includes a succession of symbols at the same or adjacent amplitude levels, the signal does include short bursts of low-frequency components which are below the cut-off frequencies of the filters 117 and 120. The demodulator 39 in FIG. 11 is thereby caused to actuate counter 119 in the manner described in response to the control signals from productor 118 to shift the phase of the covered carrier. If there is sufficient discrepancy between the phases of the recovered carrier and the line signal to operate rectifier-slicer 123, the phase correction takes place continuously during such bursts. Otherwise the counter hunts about the correct phase condition in a very small phase angle range of about two steps of the counter.

However, when data is being received there is one possible difference between the response of the demodulator to data and its response to steady carrier. When steady carrier is being received there is no alternating current present in the outputs of the low-pass filters 117 and 120, and productor 118 is responding to the polarities of two direct-current voltages. When data is being received, either with or without a phase angle error between the line signal and the recovered carrier, there are alternating-current components in the outputs of the two low-pass filters. Since such outputs are in phase with respect to one another as a result of the production of the line signal from the band shaping filter with the quadrature carrier waves from the divider 107, the productor 118 is responding to sinusoidal functions at both inputs. The product of these two inputs can be shown to have a direct-current component proportional to the sine of two times the error angle.

A phase angle error jump such as might be caused by a shift of the carrier system transmission channel from one portion of a carrier spectrum to another as hereinbefore mentioned could produce an actual error angle of 45 degrees or greater. Productor 118, because of its alternating current response as a function of sine $2\varphi_r$, would respond to that occurrence as though the error angle were 90 degrees or greater. Similarly, if the phase error angle were at least equal to 90 degrees, the producer 118 would respond as though the error angle were at least equal to 180 degrees.

FIG. 11B illustrates this type of productor operation wherein the illustrated phase error angle is the actual phase error angle. However, the polarity signs in the circle diagram quadrants correspond to the reaction of the productor to twice the error angle, in accordance with the manner in which such productor would react as described for the steady carrier case in FIG. 11A. Thus in FIG. 11B an actual phase error angle falling in the second quadrant of the circle diagram would produce a reaction from productor 118 as though such angle were twice that size, that is, an error of 100 degrees would appear to the productor as an error of 200 degrees, and in accordance with the diagram in FIG. 11A the productor would produce an output signal to cause counter 119 to count down. This is indicated by the minus sign in the second quadrant of the diagram in FIG. 11B. Similarly, an actual phase angle error which fell in the third quadrant of the circle diagram in FIG. 11B would in fact produce an output signal from productor 118 as though such error angle were in the first or second quadrant in FIG. 11A. Accordingly a positive sign is indicated in the third quadrant of FIG. 11B.

It is thus aparent that when data is being received an actual phase angle error of 90 degrees appears to productor 118 to be a phase angle error of 180 degrees; and, as shown in FIG. 11A, the productor may in that particular case cause counter 119 to count either up or down. This is illustrated in FIG. 11B wherein the arrows indicating the direction of operation of counter 119 and of error angle vector rotation are shown as going in opposite directions from either the 90 degree position or the 270 degree position corresponding thereto. The result of this condition is that the apparance of an actual phase angle error of 90 degrees may cause the counter 119 to bring about a local carrier phase shift to either the zero-degree lock-up condition or the 180-degree condition. In the 180-degree condition the output data from the receiving terminal would be garbled because of level inversion as hereinbefore noted.

It has been found that in practice the occurrence of phase angle errors of sufficient magnitude to push the phase adjusting circuitry of FIG. 11 into the uncertain quadrature positions of FIG. 11B is extremely unlikely to occur. Generally carrier system channel shifting operations of the type hereinbefore mentioned do not produce error angles of such magnitude. Nevertheless, additional circuits provided in FIG. 11 are able to cope with the possibility of phase lockup in the 180-degree phase condition during data transmission.

The massive errors resulting from operating at the 180-degree phase condition are handled with the aid of error control circuits 46. Two coincidence gates 136 and 137 in FIG. 11 are each provided with an inhibiting i.e., inverting, input connection and a regular input connection. Error control circuit 46 during normal operation produces a first output signal on a circuit 138 which initially inhibits gate 136. This inhibition is removed when error control circuit 46 has achieved framing synchronization with respect to the data transmitting terminals as previously described. This framing detected signal applied to the inhibiting input of gate 136 enables the gate during the rest of the transmission. Error control circuit 46 also produces an output on a circuit 139 which comprises the framing signals produced in error control circuit 46, and these signals are applied to enable the gate 137. Each time that the error control circuit 46 detects a sufficient number of errors to cause such circuits to send back to the data transmitting terminal 3 a request for retransmission of a word between successive framing pulses the error control circuit 46 also applies such signal on a circuit 140 to inhibit the gate 137 and operate the gate 136. The aforementioned signals on circuits 138, 139, and 140 are all available in error control circuits known in the art and circuits for driving are not shown.

During normal data transmission, when there are no errors or when the error occurrences are sufficiently few in number to permit the error control circuit 46 to correct them, gate 137 is not inhibited and the framing pulses from error control circuit 46 are coupled by the lead 139 through gate 137 and an OR gate 141 to reset plural flip-flop circuits 142 which are arranged in a binary counting circuit to count the output pulses from gate 136. If a large number of successive errors occur, such as when the demodulator phase locked up in the 180-degree phase angle error condition, the retransmit pulses on circuit 140 advance the count in flip-flops 142. The framing pulses are ineffective for resetting the flip-flops because they occur at the same time as the retransmit pulses which inhibit gate 137. A train of successive retransmit signals on circuit 140 cause the flip-flop circuits 140 to count up to a predetermined level such as, for example, four retransmit signals. An output pulse is produced at the binary "1" output of the last counter stage to trigger a monostable multivibrator 143. The output of multivibrator 143 during its unstable condition of operation inhibits the gate 103 and thereby cuts off the supply of 9600-cycle carrier harmonic to phase shifter 106.

The multivibrator 143 is adapted to have a period of unstable operation which is equal to the period of a 4800-cycle wave. Consequently, two full cycles of the 9600-cycle per second carrier harmonic wave are blocked from the phase shifter 106. When the multivibrator is restored to its stable condition the inhibition on gate 103 is removed, and carrier harmonic is once again supplied to phase shifter 106. However, the absence of two successive cycles in that waveform accomplishes a 180-degree phase shift in the divided carrier appearing in circuits 108 and 109 for the two demodulators. This is equivalent to a restoration of the zero-degree phase error angle condition.

A lead 146 is connected to the circuit 72 for applying the output of detect and delay circuit 71 through the OR gate 141 in FIG. 11 to reset the counter flip-flops 142 at the beginning of each training interval for the data transmission system to be certain that such counter is in the correct condition for detecting the 180-degree lockup state.

*Automatic equalizer*

Figure 12:
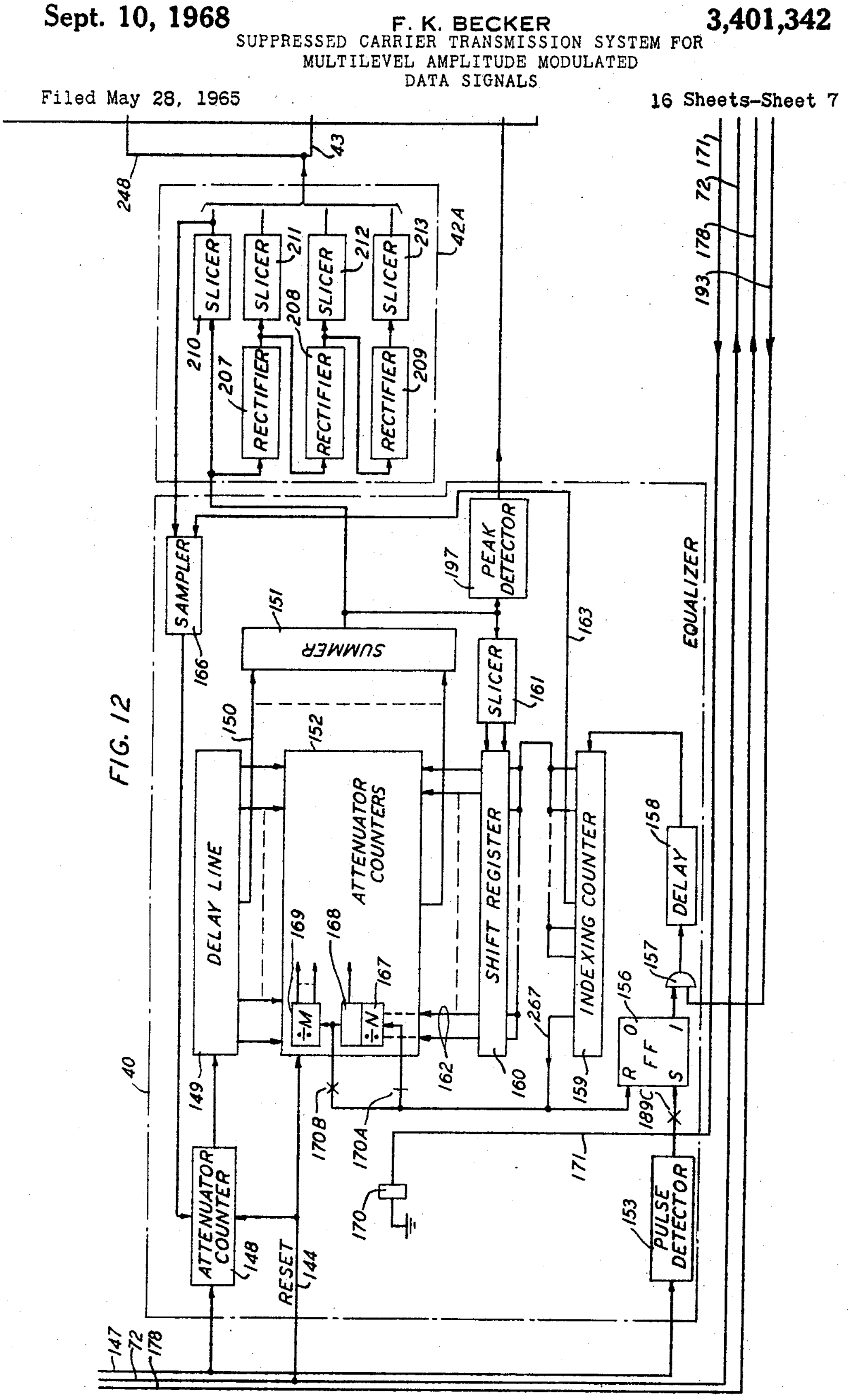

FIG. 12 includes a partial diagram of an automatic equalizer 40 which is of the type shown in the aforementioned Becker et al. equalizer application. FIG. 12 also includes the rectifiers and slicers of the symbol detecting and decoding circuits 42. Equalizer 40 is similar to the Becker et al. equalizer in that it receives input data on a circuit 147 from the low-pass filter 112 in FIG. 11. The data is coupled through an attenuator counter 148 which performs an automatic gain control type of operation for the equalizer. From the circuit 148 the data passes through a tapped delay line 149 and is coupled therefrom over one tap circuit 150 to a summer 151 and over a plurality of additional tap circuits through a set of attenuator counters 152 to the summer 151. The pilot-detected signal on lead 72 is also used on a circuit 144 in FIG. 12 to reset the equalizer attentuator counters to a predetermined initial condition at the start of each signal train transmission interval. Data and start-up training pulses are detected in a circuit 153 which sets a control flip-flop 156.

The detector 153 produces an output pulse in response to each input signal with rise time less than a predetermined maximum to be certain that it responds to the equalizer training pulses. It may also produce an output at the start of steady carrier but that single output does not produce much change in equalizer setting. The set of normally open contacts 189*c* in the input to flip-flop 156 are operated by a relay to be discussed in connection with FIG. 13 so that the equalizer can be changed in only the start-up operation.

The ONE output of flip-flop 156 enables a coincidence gate 157 to couple recovered timing wave from the symbol phase recovery circuits 41 in FIGS. 13 and 14 to a one-half period delay circuit 158. The carrier pulses in the output of delay 158 advance an indexing counter 159 during the equalizer training period portion of the start-up operation. When standard pulses are being supplied to the receiving terminal, the counter 159 supplies ADVANCE pulses to a shift register 160 that is receiving binary signals at its input from a zero level slicer 161. The outputs of the various stages of shift register 160 are applied to counting circuits in the attenuation counters 152 for controlling the direction of operation thereof as described in the Becker et al. application. Thus, the output circuits 162 couple direction control information from the last stage of shift register 160 to the attenuator counter in the counters 152 which corresponds to the first tap on delay line 149. The standard pulses, having traveled through the delay line 149, are moved through shift register 160 by the recovered clock frequency signals from counter 159 to control the direction of operation of the counters 152. An intermediate output connection 163 on the indexing counter 159 enables a sampler 166 to utilize the output of a slicer 210 in the symbol detecting and decoding circuits for controlling the attenuator counter 148 to accomplish the aforementioned equalizer automatic gain control function. The connection 163 is the one which corresponds to the tap circuit 150 on the delay line 149.

Each time counter 159 completes a cycle of operation an output pulse is produced on a circuit 167 which resets the flip-flop circuit 156 to terminate the flow of clocking pulses to the counter 159. The signal on circuit 167 is also applied to the attenuator counters to operate such counters in the direction indicated by the outputs received on control circuits previously mentioned from the shift register 160. Within the attenuation counters 152 there is a separate reversible binary counter for each of the taps, except the tap circuit 150, from delay line 149. One such counter is illustrated in simplified block and line diagram form, to illustrate the modification thereof from the aforementioned Becker et al. equalizer application in a manner which has been found to be advantageous in accordance with the present invention. Thus, the illustrated one of the counters includes a plurality of binary counting stages. A first group 167 of such stages divides by a factor N and is advantageously the four least significant stages of a total of twelve counter stages. The group 167 is adapted to perform a low level integration for averaging out the reversible counting effects which may take place as a result of the occurrence of noise near the symbol interval portion corresponding to the illustrated tap counter in the counters 152. The stages N drive the eight additional stages, each of which is provided with an output connection for operating relays to control the impedance in an attenuator network in the manner described in the Becker et al. equalizer application. In accordance with the present invention, the first stage which follows the group 167 is the stage 168, and that stages drives a further group 169 of stages for accomplishing the further division by the factor M. The group 169 in the example illustrated includes seven stages, the stage 168 being the eighth stage, and the group 167 of stages including the four additional stages to make up the total of twelve included in the illustrated counter.

The output of indexing counter 159 is coupled by means of the lead 267 to the illustrated counter, as well as all other counters, in the attenuator counters 152. At each counter the lead 267 can be applied either to the input of the first of the integrating group 167 of counter stages or to the input of the first of the final group 169 of counter stages. The selection of the particular point of application of the signal from counter 159 to the stages of the attenuator counters 152 is controlled by a relay having an operating coil 170. Relay 170 is a timed type of relay which receives an actuating signal in this case from the symbol phase recovery circuits 41 and automatically drops out a predetermined time after having received the input signal. This type of relay is well known in the art.

Normally closed contacts 170A of the relay are included in the input connection from counter 159 to the counter stage group 167 so that the output of counter 159 is normally applied to the least significant stage of each of the counters in attenuator counters 152. Relay 170 also has a set of normally open contacts 170B which are in the input to the least significant one of the stage group 169 to couple the output of counter 159 thereto. Thus when the relay 170 has been operated the pulses from counter 159 are given extra heavy weighting because they are applied through the contacts 170B directly to the most significant group of stages 169 in each of the attenuator counters 152. This causes equalizer 40 to operate in response to the standard training pulses received from the transmitter at an extremely rapid rate and achieve approximate equalization quickly. However, after relay 170 has timed out, the pulses from counter 159 are applied to the attenuator counters 152 through the contact 170A to the least significant stages thereof to perform fine equalization in small steps. Relay 170 is actuated once during each start-up operation of the data transmission system and this operation takes place in response to a symbol gear shift signal coupled to the relay on a circuit 171 from the symbol phase recovery circuits 41 in a manner which will be hereinafter described.

*Symbol phase recovery circuits*

Figure 26:
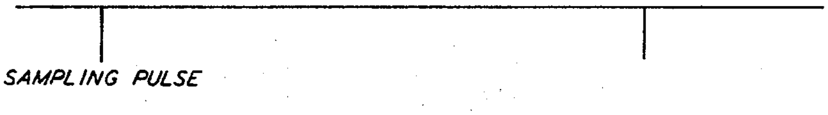
Figure 27:
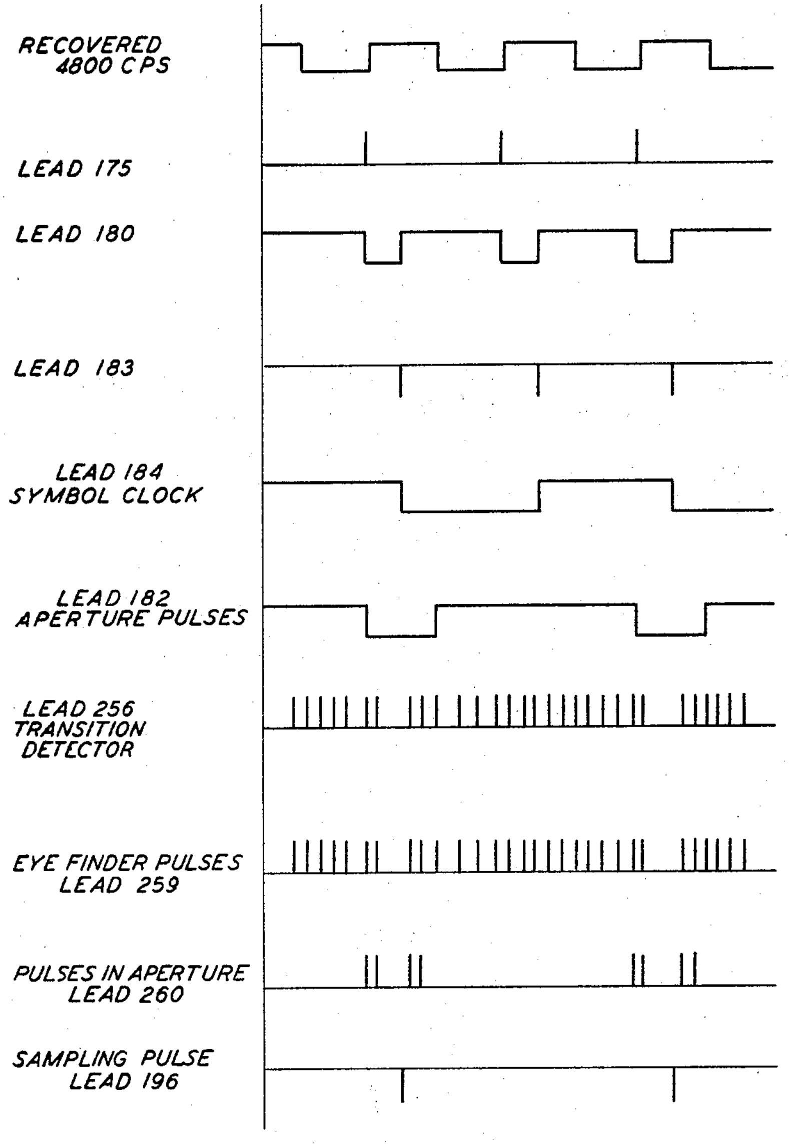
Figure 28:
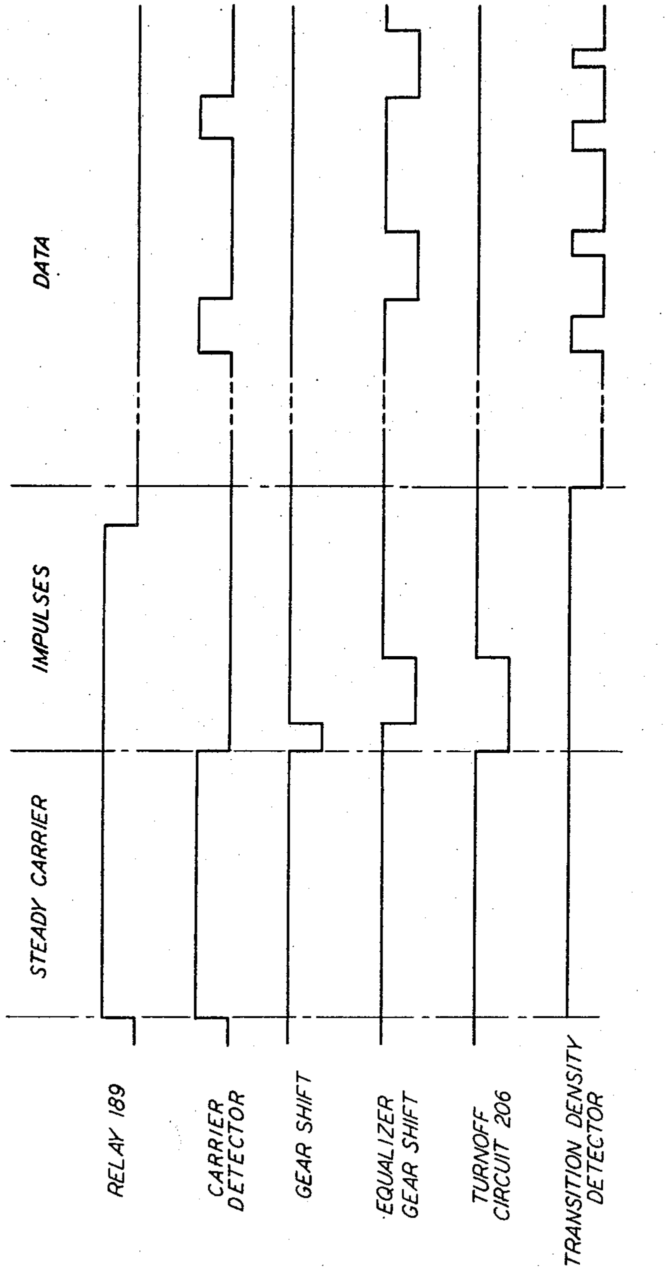

In FIGS. 13 and 14 the block and line details of the symbol phase recovery circuits 41 are illustrated. These circuits have been generally described with reference to FIG. 6. They receive in input connections a harmonic of the carrier frequency, data, and also control signals from the equalizer 40. The phase recovery circuits 41 produce output timing to the symbol detecting and decoding circuits, and they also provide timing to the subscriber station as previously described. In addition, the phase recovery circuits 41 provide cooperative control signals to the equalizer 40. FIGS. 16 through 28 include diagrams illustrating the manner of operation of the symbol phase recovery circuit 41. In FIG. 28 is included a set of timing diagrams illustrating the operation of the circuit 41 during start-up functioning of the receiver terminal. FIG. 27 is a similar set of timing diagrams for operation of the circuits 41 during the time when data is being received.

FIGS. 16 through 26 illustrate specific details of the circuit operation depicted in FIG. 27. All of the FIGS. 16 through 28 are referred to from time to time in the subsequent discussion of the symbol phase recovery circuits 41.

It is convenient to consider the symbol phase recovery circuits 41 as including three signal channels. The three signal channels are separated in FIG. 13 by heavy horizontal broken lines. The upper channel is the Data Channel, and the other channels are the Gear Shift Channel and the Timing Channel. All three channels are utilized for controlling the operation of a reversible binary counter 172 that supplies signals to a digital-to-analog converter 173. The converter produces a direct-current control signal on a circuit 176 which is coupled to a variable delay circuit 177 for controlling the amount of delay produced by the latter circuit.

The timing wave harmonic frequency supplied on a circuit 178 is a 4800-cycle per second pulse train. This harmonic is applied to the input of the variable delay 177 which is a chain of controlled bias trigger circuits of the same type previously noted in connection with the phase shifter 106 in FIG. 11. The output of delay 177 is applied to drive an aperture generator 179. The generator 179 includes a plurality of trigger circuits which are arranged in accordance with well known design techniques to produce three different output pulse trains on circuit leads 180, 182, and 183. All three trains are illustrated in FIG. 27. A first output is applied on circuit 180 to drive a conventional countdown circuit 181 which divides the frequency by two. The output of the countdown circuit 181 is utilized for a number of different purposes. One part of such output is coupled back to the aperture generator 179 where it is utilized cooperatively with the input on lead 175 to control the production of a second output from the generator on circuit 182. This second output is a 2400-cycle train of pulses, herein designated "aperture pulses," which have a duration that is advantageously slightly larger than the desired duration of the eye of the data wave under good transmission conditions.

Aperture generator 179 also produces on lead 183 at the trailing edge of each of the pulses on lead 180 a short spike-type pulse which is utilized to inhibit the application of counting pulses to the reversible counter 172 during intervals when such counter is in the process of reversing its direction of operation. This latter signal takes into account the fact that any change in the counter results in the movement, i.e. ripple, of operation signals through the counter through the required number of stages. A finite ripple time is required for such action in response to each input pulse. It is therefore desired that during the ripple which takes place in the counter when it is reversing its direction of operation no drive pulses should be applied and thereby confuse the operation results.

The durations of the output pulses from generator 179 on the circuits 180 and 182 are of course dependent upon data bit rate. The circuits of generator 179 are, therefore, arranged to be automatically altered to accommodate different data rates from the station 1 at the time that the data transmission system is set up. The apparatus for this adjustment advantageously includes relay arrangements for switching impedance networks in trigger circuit time-constant controlling impedances and is not shown.

The 2400-cycle per second pulse wave on lead 184 is utilized to control the operation of a counting direction control circuit 186 which provides up-down counting control for counter 172. Two additional input connections 187 and 187′ to direction control circuit 186 are provided to invert the manner of operation of the control 186 at certain times to be described so that during normal operation it provides the aforementioned up-down control to the counter 172. However, during the start-up operation the up-down control is inverted to provide down counting at times when it would otherwise provide up counting control and vice versa. Control circuit 186 includes a pulse amplifier with double-rail input connections controlled from circuits 184, 187, and 187′.

The signals applied to leads 187 and 187′ are under the control of the detected pilot signal which causes a direct-current control signal to be coupled to lead 72 as previously described in connection with FIG. 10. As soon as input steady carrier signals are received this detected pilot signal actuates a timing circuit 188 to operate a relay 189 and cause it to drop out a predetermined time later. In normal operation the relay 189 picks up at the beginning of the reception of steady carrier as shown in FIG. 27, and it drops out just prior to the time for the reception of data framing pulses. Lead 187 normally has a negative potential applied thereto from a negative source 190 to implement the normal operation of direction control 186. This same negative potential is also used in the gear shift channel of the symbol phase recovery circuit 41. Upon the operation of the relay 189 a set of normally open contacts 189A of that relay are closed and thereby ground the lead 187. At the same time a set of normally closed contacts 189B for the relay are opened to remove the normal ground from lead 187′ and leave that lead in a floating condition. This change of the conditions of leads 187 and 187′ reverses the mode of operation of direction control 186.

The 2400-cycle per second square wave on lead 184 is further coupled to the inputs of two pulse generators 191 and 192. The generator 191 is adapted, when enabled by the removal of the ground connection through contacts 189B, to couple the 2400-cycle per second signals to a lead 193 which provides operating input signal to the coincidence gate 157 in the equalizer of FIG. 12. This provides the clocking frequency for the equalizer as previously outlined. However, such clocking occurs only when the relay 189 in FIG. 13 is operated during the period of steady carrier and equalizer training pulses.

Pulse generator 192 advantageously includes any such generator known in the art which is capable to receiving the 2400 c.p.s. wave on lead 184 and producing a 2400-cycle train of negative-going sampling impulses on a lead 196. These latter impulses are supplied to the symbol detecting and decoding circuits 42B for utilization in a manner which will be described. The pulses on lead 196 are utilized in the symbol detecting and decoding circuits for gating pulses into the parallel side of the parallel-to-serial converter and for actuating sampling gates at the outputs of the slicers which will be described. The 2400 c.p.s. signal on the lead 184 is also utilized to drive a harmonic generator 195 for producing bit rate signals for bit synchronization in the parallel-to-serial converter. These latter signals occur at 9600 cycles per second in the illustrated embodiment and are utilized also by the subscriber station 2.

The circuits of the gear shift channel in the symbol phase recovery circuits 41 make it possible for such recovery circuit 41 and the equalizer 40 to converse back and forth with one another during the receiver terminal start-up operation. This causes the initialization of the equalizer and the initial phase pull-in in the recovery circuits 41 to be accomplished in a rapid, cooperative manner. If this cooperation were not provided, the initial phase pull-in on the timing wave frequency harmonic could be erroneous, but more importantly the equalizer initialization is likely to be incorrect. The shift register 160 of the equalizer 40 is advanced in a very precise manner in response to the same recovered carrier function that is to be used for the data detecting and decoding operation. Therefore, if the equalizer were initialized on a recovered carrier frequency wave that was not in the correct phase relationship with respect to the data, the entire equalizer function would be incorrect and gross errors could be injected into the data as a result.

At the beginning of the start-up operation, the interval of steady carrier causes the pulse train of a frequency of 4800 cycles per second to be applied on the circuit 178 to the timing channel of the symbol phase recovery circuit 41 as has been previously described. In addition the pilot-detected signal on lead 72 resets counter 172 to approximately the center of its counting range. However, during that time the relay 189 is in its operated condition and the pulse generator and gate circuit 191 is enabled. Accordingly, clock frequency is supplied from that generator on the circuit 193 to the equalizer, and the indexing counter 159 thereof is operated. However, the first counter output pulse on lead 167 resets flip-flop 156 and prevents further equalizer operation because other carrier signals are not coupled through detector 153. The single cycle of counter 159 is insufficient to change attenuation fixed by counters 152 because relay 170 has not yet been operated.

At the end of the interval of steady carrier, the standard training impulses are applied from the transmitter as already described, and these impulses actuate detector 153 to set flip-flop 156. Thus, the counters 152 are operated on each training pulse but only at the rate permitted with stages 167 in the circuit. The training pulses appear in the output of the summer 151 and are applied through a pulse peak detector 197 to an input of a set of gating circuits 198 which are arranged to steer such pulses to different input connections of the reversible counter 172 in response to different conditions of the equalizer 40. Gates 198 also respond to the phase relationship between the training pulse peaks and the aperture pulses. Initially the gates 198 couple training pulses to counter 172 on a circuit 199. The latter circuit drives only the five most significant stages of the counter 172 so that it causes counter operation in large steps in the direction dictated by direction control 186.

The direction of counter operation indicated by control 186 changes at a rate of 4800 times per second, i.e. in response to each transition of the 2400-cycle per second signal on lead 184. Thus during one half cycle of the signal on lead 184 the counter counts up and during the next half cycle it counts down, if during each of those half cycles it is provided with drive pulses at some input connection. The training pulses are applied at a rate which is much lower than the symbol rate, e.g. 75 pulses per second; and counter 172 operates in response to such pulses in large steps to shift the phase of the timing wave toward phase coincidence with the training pulse peaks. Referring to FIG. 27, the carrier phase is shifted to bring the aperture pulses toward phase coincidence with the peak of the training pulses, not shown. Incorrect phase lock-up about the positive-going transitions of the symbol clock wave on lead 184 is avoided because the signals on leads 182 and 184 have a fixed relationship to each other and the counter direction is fixed with respect to the symbol clock polarity.

The aperture pulses on lead 182 enable a portion of the steering gates 198 so that such gates can be actuated by any training pulse peaks which occur during an aperture pulse. The gates steer such training pulse peaks onto a circuit 200 instead of the circuit 199. The circuit 200 applies such pulses to the least significant input of the ten most significant stages of counter 172 for operating that counter in somewhat less coarse steps, and circuit 200 also applies such pulses to a phase recovery gear shift counter 201. Counter 201 is initially reset to its zero count condition at the end of the interval of steady carrier in the start-up interval by a carrier-detected signal. The latter signal is the output signal transition from the rectifier-slicer 126 in demodulator 39, and it is coupled to counter 201 on a lead 194. Each pulse on lead 200 advances the counter and a following pulse on lead 199 resets it. When the counter has counted a predetermined number of successive training pulses within the aperture pulse range hereinbefore mentioned, and with no intervening pulses on lead 199, it supplies an output gear shift signal on the circuit 171 to actuate the relay 170 in the equalizer 40 of FIG. 12. This signal is also coupled by lead 202 to prevent the application of any further training pulses to lead 199.

The signal on lead 171 tells the equalizer that the symbol phase recovery circuit has operated in response to the incoming standard training pulses through a range of coarse phase adjustment, and that a coarse phase pull-in has been achieved to an extent such that coarse phase adjustment operation has been discontinued and the phase recovery circuits have shifted into a less coarse adjustment phase of operation. As previously noted, this gear shift signal from the phase recovery circuits initiates the operation of equalizer 40 in coarse steps.

As soon as equalizer 40 has completed its initial coarse equalization, the relay 170 drops out as previously noted and a set of normally closed contacts 170C in a circuit 203 in FIG. 3 are thereby closed to ground that circuit which is connected to an input of turn-off gates 206. The latter gates provide an enabling input to gates 198 to permit the coupling of training pulse peaks to lead 200 until coarse equalization is finished. Gates 206 respond to the coincidence of two factors. One is the occurrence of either the gear shift signal in the output counter of 201 indicating that coarse phase adjustment is complete or the aforementioned signal on circuit 203 indicating that coarse equalizer adjustment is complete. The second factor is the restoration of a negative signal on the circuit 187 indicating that relay 189 has dropped out and that the fine equalizer adjustment has begun. Upon the concurrence of all of these conditions, the gates 206 remove their enabling signal from the gates 198 thereby blocking the coupling of further pulses to counter 172 by means of the circuit 200. Since the circuit 199 had already been previously blocked by the signal on lead 202 from counter 201, the counter 172 is completely disabled at this time. However, it resumes its phase adjusting operations subsequently when sufficient data is received, and the manner of this operation in connection with the data channel will be hereinafter described.

A portion 42A of the symbol decision and decoding circuits 42 previously mentioned in connection with FIG. 6 is shown in FIG. 12 and is utilized in cooperation with the symbol phase recovery circuit 41 and the data channel therein for controlling timing wave phase during data transmission. The decoding circuits 42A include, for a system which can handle up to sixteen data amplitude levels, three folding rectifier circuits 207, 208, and 209, as well as four slicer circuits 210, 211, 212, and 213. These rectifier and slicer circuits extract from the demodulated and equalized data signal the necessary decoding information relating to magnitude of signal amplitude as well as polarity thereof at the sampling times, and the rectifiers and slicers also provide to the symbol phase recovery circuits 41 indications of the times at which any signal transition passes through any of the plural signal slicing levels which are utilized to discriminate among the various information-determinate signal amplitude levels. All of the rectifiers are the same and all of the slicers are the same. Schematic diagrams of a rectifier circuit and a slicing circuit are shown in FIGS. 29 and 30, respectively.

Figure 29:
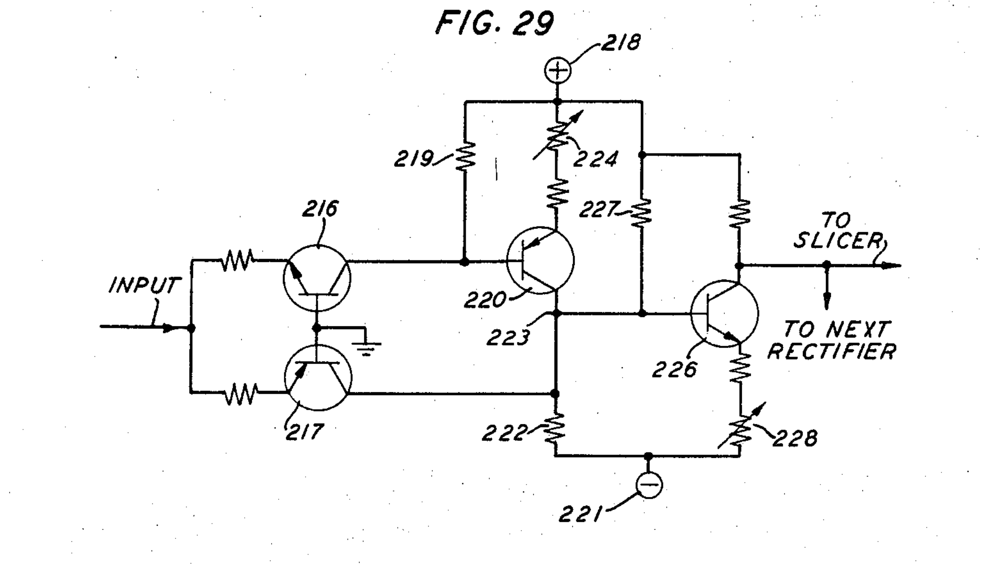
FIG. 29 is a schematic diagram of a rectifier circuit in FIG. 12.
Figure 30:
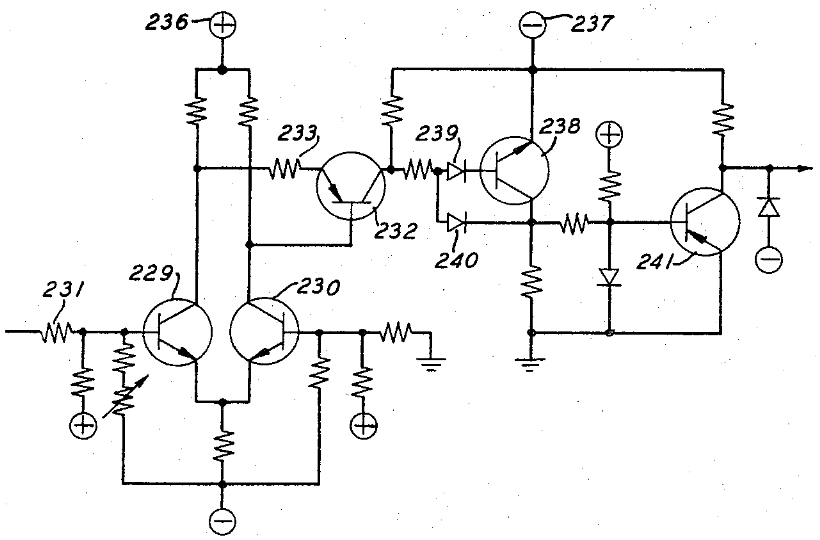
FIG. 30 is a schematic diagram of a slicer circuit in FIG. 12.

The rectifier circuit in FIG. 29 receives input signals from the equalizer 40 or from another rectifier and these signals are coupled to the base-emitter circuits of two transistors 216 and 217 of complementary conductivity types. The base electrodes of both transistors are connected to ground. In FIG. 29 transistor 216 is shown as an N-P-N transistor and the transistor 217 is shown as a P-N-P transistor. Negative input signals draw the transistor 216 into conduction by virtue of the connection of the collector electrode thereof to a source 218 of positive potential which is coupled through a resistor 219 to such collector electrode. The potential drop developed across resistor 219 biases a transistor 220 into conduction, and the current flow through the emitter-collector circuit of this P-N-P transistor between the positive source 218 and a negative potential source 221 develops a positive-going potential at the collector electrode of transistor 220. The bias circuits for transistor 220 are adapted so that the transistor normally conducts lightly with its collector electrode approximately at ground potential.

Positive input signals to the rectifier circuit in FIG. 29 drive the P-N-P transistor 217 into conduction and bias transistor 216 off. The conduction in transistor 217 causes current to flow through a resistor 222 to the negative potential source 221. Accordingly, a positive-going potential is developed across the resistor 222. Thus, regardless of which of the transistors 216 or 217 is conducting for either negative or positive input signals, a positive-going potential is developed at the terminal 223 which corresponds to the collector electrode of transistor 220. A rheostat 224 is included in the emitter circuit of transistor 220 for adjusting circuit symmetry to provide similar responses for either positive or negative input signals.

A common emitter amplifier including a transistor 226 is arranged with its base electrode connected to the terminal 223 for receiving the aforementioned positive-going potentials representing the full wave rectified input signal. Transistor 226 is normally biased in a conducting condition in the absence of input signals by means of the potential drop developed across a potential divider including a resistor 227 and the resistor 222. Under such conditions the output at the collector electrode of transistor 226 is at its negative-most level.

Transistor 226 is drawn into heavier conduction for linear amplification by the aforementioned rectified positive-going signal excursions to develop at its collector electrode a signal which starts at the mentioned negative potential level and extends in a positive-going fashion as input signals to the base electrode increase. The maximum anticipated positive signal at terminal 223 also produces a positive output at the collector electrode of transistor 226. These output signals are applied to any next succeeding rectifier in the symbol detecting and decoding circuits 42B and they are also applied to one of the aforementioned slicer circuits.

The basic function of the common emitter stage including transistor 226 in the rectifier circuit is to amplify and re-reference the full wave rectified signal at the input to such transistor. The total amplitude swings of unrectified input and rectified output from transistor 226 are the same. In addition, the rectified signal at terminal 223 is re-referenced so that the range of its maximum swing is approximately symmetrical with respect to a zero voltage axis. A rheostat 228 is included in the emitter circuit of the transistor 226 for making fine adjustments in the level positioning of the output wave.

Figure 31:
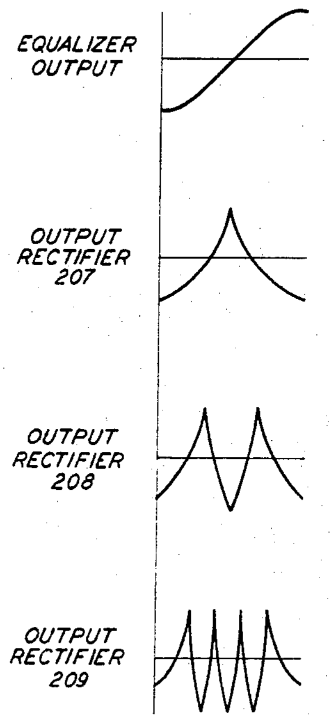
FIGS. 31 and 32 are voltage wave diagrams illustrating the operation of FIGS. 29 and 30.

FIG. 31 includes a family of wave diagrams illustrating the type of operation which characterizes the rectifier circuits 207 through 209. The first wave form is a single signal excursion through the zero voltage axis. This excursion extends between two adjacent symbol sampling intervals and is considered to cross through all of the fifteen signal slicing levels in order to illustrate the operation of the rectifier and slicer circuits herein presented. The output of rectifier circuit 207 shows that the signal received from the equalizer has been full wave rectified and re-referenced by the circuit of transistor 226 so that it extends in both positive and negative directions once more in its rectified form. The wave form in the output of rectifier 207 extends approximately equally in the positive and negative directions because it was specified at the outset to be a signal which extended from the extreme negative excursion through the zero voltage axis to the extreme positive-going excursion. The output of the rectifier 207 now crosses the zero voltage axis two times and has the appearance of the equalizer output wave folded in a negative direction along its original zero voltage axis.

In a similar fashion the output of rectifier 207 is by the rectifier 208 again full wave rectified to accomplish a similar folding operation about the new zero voltage axis. The second folded format of the signal wave is again re-referenced as hereinbefore described to provide in the output of rectifier 208 the folded wave form which has four transitions through its new zero voltage axis. The output of rectifier 208 is further applied to rectifier 209 which accomplishes an additional folding and re-referencing operation to produce the thrice folded signal wave in the output which has eight zero axis crossings.

Figure 32:
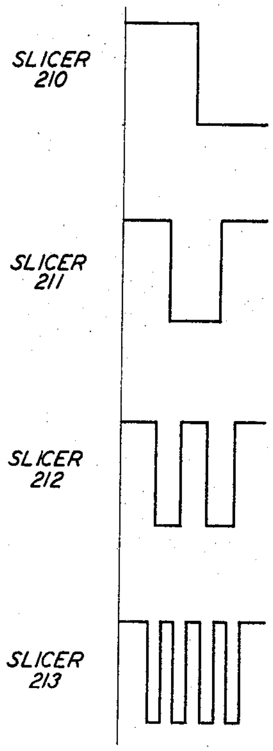

The slicer circuits 210 through 213 receive the signal waves of the types illustrated in FIG. 31 and produce therefrom the corresponding rectangular signal pulses illustrated in FIG. 32. The pulse edges occur at the times of input signal axis crossings and those pulse edge transitions comprise the transition information used by the symbol phase recovery circuits 41. The amplitude information in the pulses of FIG. 31 is utilized by the decoding circuits. Each slicer circuit includes, as shown in FIG. 30, a differential amplifier having two amplification transistors 229 and 230 which are normally biased in the absence of input signals for substantially equal conduction in each transistor. Input signals are received via a resistor 231 either from the equalizer 40 or from one of the rectifiers, and such input signals are of the format illustrated in FIG. 31.

A further transistor 232 has its base-emitter circuit connected in series with a resistor 233 between the collector electrodes of the transistors 229 and 230. Thus, if the latter two transistors are conducting approximately equally, the potentials appearing at their respective collector electrodes are also approximately equal, and the transistor 232 does not conduct. If transistor 229 should respond to a positive-going input signal and conduct more heavily than does the transistor 230, the potential difference presented to the transistor 232 is negative and the latter transistor remains nonconducting. However, a negative-going input signal tends to reduce the conduction in transistor 229 with the well-known feedback effects which increase conduction in transistor 230, and the resulting shift in the potentials at the collector electrodes of transistors 229 and 230 drives transistor 232 into conduction. Emitter-collector current for transistor 232 is supplied from the positive potential source 236 and a negative potential source 237.

Conduction in transistor 232 produces a positive-going signal which is coupled to the base and collector electrodes of a further transistor 238 through saturation-preventing diodes 239 and 240. Transistor 238 is normally nonconducting and is arranged in a common emitter configuration. A positive-going signal excursion at the collector electrode of transistor 232 biases the transistor 238 into conduction and produces a negative-going potential at the collector electrode thereof. This latter potential biases a further transistor 241 into conduction to produce a positive-going ground output signal in response to the negative-going input signal applied through the series resistor 231 to the slicer circuit. It will be observed in FIG. 32 that if the recovered carrier phase were locked in the 180° condition which caused data inversion as mentioned in connection with FIG. 11, the output of slicer 210 would be inverted and change the data represented thereby.

The corresponding outputs from each of the slicers 210 through 213 when taken together comprise the Gray coded form of the multilevel information supplied from equalizer 40. Those outputs are individually coupled by input connections, schematically represented by a single circuit 248, to a set of sampling gates 249 in the symbol decision and decoding circuit portion 42B. Gates 249 are actuated at the symbol rate of 2400 cycles per second by the sampling pulses on circuit 196 from the phase recovery circuit 41. Each operation of the gates 249 causes the outputs of the slicer circuits to be coupled to a set of memory flip-flop circuits 250 which store such outputs. Subsequently, and with some suitable time delay facilities, the contents of the memory flip-flops are coupled to a parallel-to-serial converting circuit 251. Binary coded information in converter 251 is then pulsed out to the receiving subscriber station 2 at the binary bit rate of 9600 cycles per second.

The four outputs from the four slicers 210 through 213 are also individually coupled by circuits which are schematically represented by the lead 43 to the separate input connections of a slicer output selection circuit 252. This circuit includes any suitable means for selecting the outputs of different slicers as may be appropriate for different binary bit rates of transmission. Thus, for example, if the binary bit rate were only 2400 bits per second, the output of only slicer 210 is utilized. However, as the bit rate is stepped up in increments of 2400 bits per second, an additional slicer is utilized at each level until at the 9600 bits per second transmission rate all four slicers are being used at the same time. Additional connections are also advantageously included, but not shown, for altering the time constants of pulse generators such as those in the aperture generator 179 which produce pulses that must have durations corresponding to data symbol interval duration. Thus, the selection of appropriate pulse generator time constants and data bit rates can all be accomplished in one operation.

The output of selection circuit 252 is applied to a transition detector 253 wherein each of the slicer outputs is differentiated and the differentiated signals are then full wave rectified and OR'd into a common pulse regenerating amplifier for sharpening the pulse configuration. The output of such amplifier then is a train of pulses wherein each pulse corresponds to a signal wave transition in the output of one of the slicers and thus corresponds to a transition of the data symbol signal through one of the predetermined slicing levels for the multilevel data signal. This output wave is not random because the pulses do have a characteristic distribution which is partially indicated in FIG. 27. It can be seen there that there are no transition pulses in the time intervals corresponding to the central portions of each of the aperture pulses on lead 182. This is another way of indicating that there are no transition pulses in the central portion of the data eye pattern.

Figure 16:
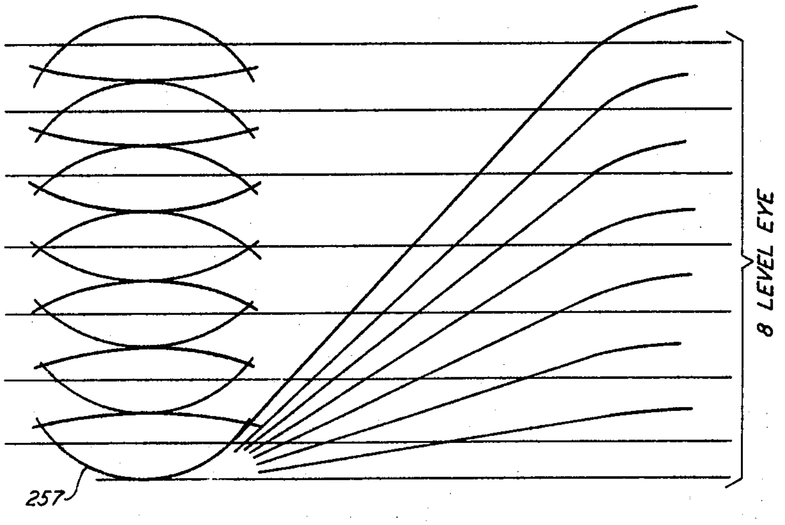
FIGS. 16 through 28 are various diagrams utilized to illustrate the operation of the symbol phase recovery circuits of FIGS. 13 and 14.
Figure 17:
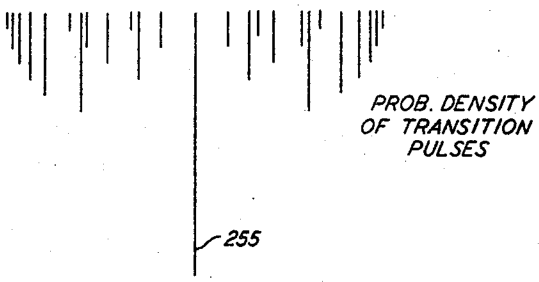

Another characteristic of the transition pulse train appearing on lead 256 is considered in connection with FIGS. 16 and 17. FIG. 16 illustrates a portion of an eight-level data eye pattern. Only eight levels are illustrated in order to have a practical scale which is large enough to indicate what is taking place. Similarly, only a limited number of traces are indicated for the same reason. Two traces are shown to define each of the seven eyes in the eye pattern of the eight-level data signal. The seven horizontal lines in FIG. 16 represent the seven slicing levels for such eight level data signal. The bottom-most trace 257 in FIG. 16 is shown as branching out into eight different branches at the right hand side of the figure; and these branches correspond to the possibility which is present for each of the signal traces illustrated that it may go, in the next symbol interval, to the same signal level or any one of the remaining seven signal levels. However, a trace which goes from one information-determinant signal level to another must cross at least one signal slicing level and thereby produce a pulse in the train on lead 256, which is illustrated in FIG. 27. Furthermore, any signal trace which in passing from one information-determinant level to another between successive eyes, and which in the process crosses an odd number of slicing levels, must of necessity cross one of those slicing levels at a time point which is approximately midway between the two successive data symbol sampling times. This fact becomes more apparent upon a consideration of FIG. 17 which represents a long-time probability density distribution of transition pulses between successive eyes of a data eye pattern.

It is seen in FIG. 17 that there is no likelihood of data transitions at the center of the eye. The probability of transitions occurring is maximum midway between two eyes and increases again as the edge of the eye is approached. As shown, the envelope of the distribution of the transition pulse probability has an extremely large peak 255 at the time center corresponding to the aforementioned fact that signals crossing an odd number of slicing levels must cross a slicing level approximately midway between data eyes. Approximately equal numbers of transitions occur on each side of the peak 255. This transition distribution characteristic is utilized in accordance with the invention for controlling the phase relationship of the sampling pulses to achieve an optimum relationship with respect to the data signal and the eye patterns thereof. For this purpose, a further set of steering gates 258 is employed in FIG. 13 for steering data transition pulses on the lead 256 to predetermined input connections of the reversible counter 172 which controls the recovered carrier phase for symbol decoding and detecting purposes.

The gates 258 couple all transitions to a circuit 259 which applies such pulses to the input connection of the least significant stage of the counter 172 for driving that counter in the direction indicated by the output signals from direction control circuits 186. Transition density detector circuits 260 also receive the transition pulses on lead 256 for producing an output control signal which is applied to the gates 258 for enabling those gates at any time when the rate of appearance of transition pulses is adequate to assure reliable phase adjustment. The detector 260 advantageously includes a monopulser triggered by the transition pulses and having a time constant which is less than minimum possible interval between transition pulses but which is advantageously adjusted any time that the data rate at station 7 is adjusted as hereinbefore mentioned. The output of the monopulser is coupled through a low-pass filter and a slicer having a threshold level which is set to correspond to the minimum acceptable amplitude of low-pass filter output for the minimum reliable data transition rate previously mentioned. If the slicer is actuated, its output enables the steering gates 258 to operate as hereinbefore described. However, if the transition rate falls to a low level, the slicer remains inoperative, and the enabling signal for the gates is removed, thereby preventing operation of counter 172 in response to data signal transition pulses.

Figure 18:
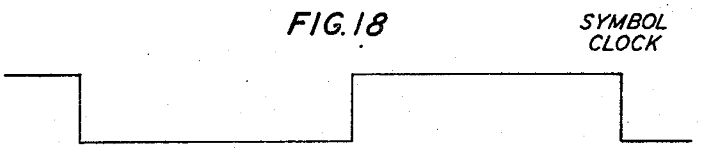

FIG. 18 illustrates the symbol clock waveform on lead 184, shown in enlarged scale compared to that shown in FIG. 27. In FIG. 18, the enlarged scale corresponds to the scale of the eye pattern of FIG. 16. It can be seen that the negative-going transitions of the symbol clock wave occur in the centers of the eyes, and the positive-going transition coincides with the peak 255 of the transition pulse distribution density characteristic. Since transition pulses are about equally distributed on each side of peak line 255, counter 172 counts up and down between eyes, but its average count does not change as long as distribution balance is held. However, if the symbol clock wave of FIG. 18 should be shifted either to the right or to the left with relation to the data signal wave, the number of data wave transitions which are likely to occur in any given half cycle of the symbol clock wave shifts. Instead of the number of transitions being approximately equal in each half cycle for the desired phase relationship there are more transitions in the positive symbol clock half cycle interval for a leading symbol clock phase and, conversely, there will be more data symbol transitions in the negative half cycle interval of the symbol clock for a lagging symbol clock phase relationship with respect to the data eye pattern of FIG. 16.

Assume that direction control 186 is adapted to drive counter 172 up to correct a leading phase and that a carrier-leading phase condition exists. The counter will receive more drive pulses from the lead 259 during the positive half cycle of the symbol clock wave on lead 184 than it receives during a negative half cycle. Consequently, it will during the positive half cycle count up by more steps than it counts down during the negative half cycle with the result that the digital-to-analog converter 173 will provide a direct current signal which is more positive to the variable delay 177. Delay 177 responds by injecting more delay in the carrier harmonic wave and thereby bringing the symbol clock phase toward coincidence with the data phase. Conversely, the direction control circuit 186 would for a lagging phase relationship cause the counter 172 to have a net down counting operation in response to transition pulses from circuit 259 for any given symbol interval. The delay in circuit 177 is thereby reduced and the symbol clock phase is advanced to bring it into proper phase relationship with respect to the data eye pattern. Thus, in this type of operation, the symbol clock wave is utilized to "find" the data eye with the negative-going symbol clock transitions. This can be seen from a comparison of the wave diagrams of FIG. 18 for the symbol clock and FIG. 19 for the sampling pulses with reference to the corresponding diagrams for the waveforms on leads 184 and 196 in FIG. 27.

Figure 19:
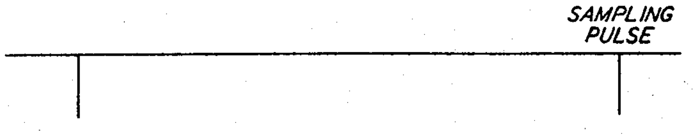
Figure 20:
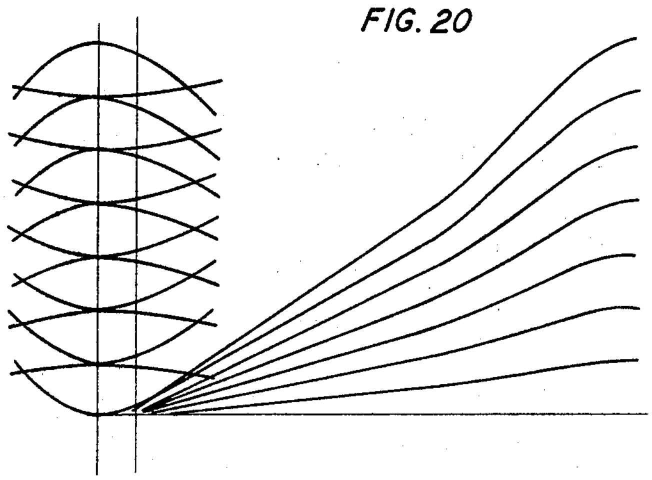
Figure 21:
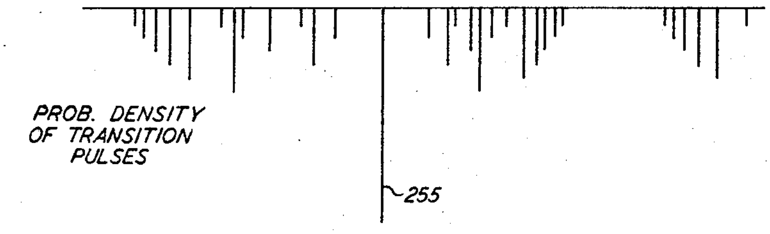

In reviewing FIGS. 16 through 19, it is apparent that the centering of the sampling pulse of FIG. 19 in the eye of the data wave depends upon the centering of the peak 255 in the distribution envelope at approximately the midpoint between the centers of two adjacent eyes. Such centering in turn depends upon obtaining symmetrical pulse shapes, which are rarely obtained except in idealized cases. In the practical data signal wave after equalization, there is usually some lingering distortion in the wave. Such distortion, which is illustrated in one form in a further eight-level eye pattern in FIG. 20, causes a shift of the peak 255 of the distribution characteristic from the midpoint between the data eyes. Consequently the previously described data channel operation forces the negative-going transitions of the symbol clock wave on lead 184 away from the center of the eye. Shifting of the symbol clock also pulls the sampling pulses in FIG. 23 away from the center of the eye and increases the probability of error since the voltage amplitude height of the eye at the new sampling time is considerably smaller and much more closed in upon the signal slicing level for any given eye.

In order to correct the shifted sample situation, the aperture pulses on circuit 182 from the aperture generator 179 in the timing channel are utilized by the data transition steering gates 258 in accordance with the present invention. The aperture pulses additionally steer data transition pulses to a gate output circuit 260 when such transition pulses fall within the time interval of an aperture pulse. This is shown in FIG. 27 wherein the aperture pulses on lead 182 for an in-phase condition bracket two of the data transition pulses at the beginning and at the end of each eye so that the gates 258 cause two pulses to appear on lead 260 at the beginning of each eye and two pulses at the end of each eye. These same pulses are also steered by the gates 258 to the lead 259, as previously mentioned.

Pulses from lead 260 are coupled to the lead 200 in the output of the training pulse steering gates 198 which, as previously mentioned in connection with the gear shift channel, is applied to the input of the ten most significant stages of counter 172 and bypasses the two least significant stages. Thus, transition pulses from the gates 258 which are outside of the aperture pulse intervals are applied to only the least significant stage of the counter, and pulses that are within the aperture are applied both on the leads 260 and 200 to a more significant stage and on the lead 259. Accordingly, the transition pulses which are within the aperture have a greater influence upon the output from digital-to-analog converter 173 than do the pulses outside the aperture. It can be seen from a comparison of FIGS. 22 and 24 that transition pulses which appear in one half of an aperture pulse in FIG. 24 affect counting operation in one direction, and transition pulses appearing in the other half of the aperture pulse affect counter 172 while it is counting in the opposite direction. This arises from the fact that the aperture pulse is centered on a transition of the symbol clock wave on lead 184 and also from the fact that the direction of operation of counter 172 is reversed in response to each transition in a symbol clock wave 184, as previously described.

Figure 22:
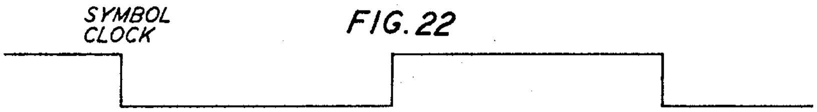
Figure 23:
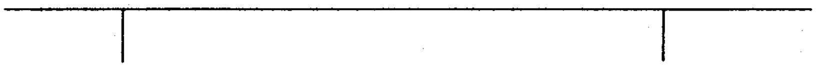
Figure 24:
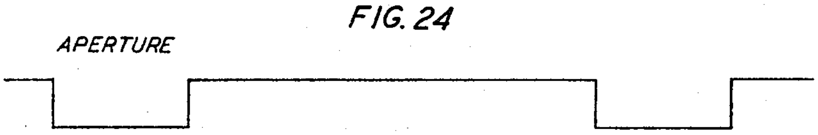
Figure 25:
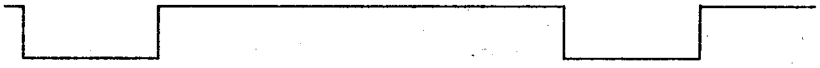

When the incorrect phase relationship exists between the symbol clock and the data wave, as shown in FIGS. 20 through 24, the data wave transitions of slicing levels are still approximately equally distributed between the two halves of the symbol clock waveform shown in FIG. 22. However, in the shifted condition illustrated in FIG. 24, the aperture pulse embraces a greater number of transition pulses in the trailing half of such aperture than are included in the beginning half of the aperture pulse. In fact, for a sufficiently large phase angle error there may be no transition pulses in the initial half of the aperture pulse. Since each of the transition pulses which falls within the aperture pulse interval has a much greater weight in the operation of counter 172 than do transition pulses outside of the aperture, counter 172 is forced to more nearly conform to the aperture pulse effect even though the eye finder control is not satisfied. Relating the discussion of FIG. 24 to the discussion of FIG. 18, the FIG. 24 illustrates a lagging phase relationship of the aperture wave behind the data wave. The transition pulses in the last half of the aperture pulse interval coincide with a negative-going half of the symbol clock wave on lead 184. As indicated in connection with FIG. 18, the counter is operated under such conditions to count down to correct the lagging phase relationship. Thus, even though the eye finder pulses on lead 259 have attained a satisfactory phase condition, the aperture transition pulses drive the clock phase back to a point which is approximately centered on the data eye so that there are equal numbers of data transitions in the beginning portion and the ending portion of the aperture wherein the counter is operating in opposite directions. This effect of the aperture pulses overrides the broad or coarse centering effect of the symbol clock pulses which were previously described and causes the symbol clock wave to have its negative-going transitions recentered on the data eye in spite of the position of the data transition distribution peak 255 so that the sampling pulses are once more produced in the center of the eye, as shown in FIGS. 25 and 26.

Thus, the symbol phase recovery circuits provide cooperative control with the automatic equalizer 40 for accomplishing in a convenient and accurate manner the initial coarse adjustment of timing wave phase for symbol decoding and the initial coarse adjustment of the equalizer. After start up, the symbol phase recovery circuits 41 utilize relatively high frequency transition information when it is contained in the outputs of the slicers 210 through 213 to continue supervision of the phase relationship between the data signal and the symbol timing so that an optimum phase position is achieved for sampling pulses utilized in symbol detecting and decoding. If insufficient high frequency transition information is contained in the demodulated signal, phase adjustment is stopped and counter 119 remembers its last condition until it can be operated again. This phase adjustment depends upon accurate maintenance of signal amplitude levels and signal configuration by the automatic gain control circuits 37 and the automatic equalizer 39 as well as accurate demodulation. The operations of these latter circuits also influence one another and influence the operation of the carrier frequency recovery circuits 38. The cooperative operation among the various blocks of the vestigial sideband multilevel data transmission system described herein make it possible to accomplish data transmission between subscribers at data bit rates which are substantially in excess of the bandwidth capabilities of the communication link with smallest bandwidth between the two subscriber stations. This operation is further possible on a substantially automatic basis so that it is not necessary for an attendant to maintain continuous surveillance of signal amplitude and phase relationships in order to achieve accurate transmission results.

Although the present invention has been described with reference to a particular embodiment thereof, it is to be understood that additional embodiments and modifications which utilize the underlying principles of the invention and will be obvious to those skilled in the art are included within the scope of the invention.

What is claimed is:

1. In combination, means receiving a multilevel amplitude modulated data signal having the carrier frequency $f_c$ suppressed and having an unknown offset in all frequency components of such signal, said signal also including distortion, automatic gain control means coupled to said receiving means for holding the average modulated signal amplitude within a predetermined range of signal amplitudes, means recovering from said data signal in the output of said automatic gain control means a timing wave at the suppressed carrier frequency $f_c$, a carrier wave at the sum frequency $f_c'$ of the suppressed carrier frequency and any offset frequency, and further waves at predetermined harmonics of said carrier and sum frequencies, demodulating means comprising first demodulation means responsive to said sum frequency $f_c'$ demodulating the data signal in the output of said automatic gain control means to produce data signals without said offset frequency, second demodulation means operating as a quadrature demodulator, and means responsive to the outputs of both demodulation means for bringing the phase of said carrier wave into a predetermined substantially constant phase relationship with said data signal, an automatic equalizer coupled to the output of said first demodulation means for compensating said data signal for said distortion therein, means cooperating with said automatic equalizer for adjusting the phase of said timing wave into a predetermined substantially constant relationship with said data signal, means responsive to the output of said phase adjusting means for said timing wave decoding the data signals in the output of said equalizer, and error control means responsive to the output of said phase adjusting means for said timing wave and coupled to the output of said decoding means.

2. The combination in accordance with claim 1 in which said automatic gain control means comprises, a linear amplification means having adjustable gain in its range of linear amplification, and means responsive to a predetermined frequency component of said data signal adjusting the gain of said amplification means to compensate for variations in the magnitude of such component in the output of said amplifier.

3. The combination in accordance with claim 2 in which said data signal is an electric signal, said linear amplification mean includes adjustable electric signal attenuation means for varying the insertion gain of said amplification means, said attenuation means having a unilateral adjustment characteristic, and means responsive to the magnitude of said predetermined frequency component are provided for adjusting said attenuation means, said adjusting means having a nonelectric output coupling to said attenuation means.

4. The combination in accordance with claim 1 in which said data signal includes two pilot frequencies $f_H'$ and $f_L'$ higher than and lower than said frequency $f_c'$, respectively, said automatic gain control means includes means responsive to said frequency $f_L'$ for adjusting gain to maintain such frequency substantially constant in amplitude, said carrier frequency recovery means includes means limiting the amplitude of said frequency $f_H'$ to a substantially constant predetermined level, said combination also including modulation means receiving said frequencies $f_H'$ and $f_L'$ for producing said carrier frequency $f_c$ with no carrier offset, means dividing down the frequency of the output signal of said modulation means to produce a frequency $f_L$ having no carrier offset, modulating means receiving said frequency $f_H'$ and said frequency $f_L$ for producing said carrier frequency $f_c'$ with carrier offset, and means coupling said carrier frequency with no carrier offset $f_c$ to said cooperating means for phase adjustment and coupling said carrier frequency with carrier offset $f_c'$ to said first and second demodulation means.

5. The combination in accordance with claim 4 wherein said dividing means comprises a binary counter adapted to divide said carrier frequency $f_c$ down to a frequency $f_L$, an oscillator tuned to said frequency $f_L$, means coupling said frequency $f_L$ from the output of said counter to synchronize said oscillator, and means responsive to a predetermined difference in phase between the synchronizing signal from said coupling means and an output of a first stage of said counter resetting all stages of said counter.

6. The combination in accordance with claim 1 in which said demodulating means comprises means coupling from said recovering means one of said predetermined harmonics $nf_c'$ of said carrier wave frequency $f_c'$, and means adjusting the phase of said harmonic $nf_c'$ in accordance with both the magnitude and the relative polarity of the outputs of said first and second demodulation means.

7. The combination in accordance with claim 1 in which said data signals are preceded by a predetermined train of start-up signals, said cooperating means includes means adjusting the phase of said timing wave in coarse steps in response to a first predetermined portion of said start-up signals and toward the phase of said start-up signals, means responsive to a predetermined maximum phase discrepancy between said start-up signals and said timing wave controlling said phase adjusting means to adjust the phase of said timing wave in fine steps and for simultaneously starting the adjustment of said equalizer in coarse steps, means responsive to the completion of said coarse steps of equalizer initialization for terminating said fine steps of timing wave phase adjusting, and means responsive to the termination of said train of start-up signals operating said timing wave phase adjusting means in response to data signal transitions through predetermined signal levels thereof.

8. In combination, means receiving a multilevel amplitude modulated data signal having the carrier frequency $f_c$ suppressed and having an unknown offset in all frequency components of such signal, said signal also including distortion, the modulated signal bandwidth and the bandwidth of the baseband signal included therein having at least partially overlapping portions, automatic gain control means coupled to said receiving means, said control means including unilateral feedback means utilizing a feedback control signal which is physically of a different type from said data signal for adjusting insertion gain without introducing significant distortion frequency components in the band of either said modulated or said baseband signal, means recovering from said data signal in the output of said automatic gain control means the suppressed carrier frequency $f_c$, the sum frequency $f_c'$ of the suppressed carrier frequency and any offset frequency, and predetermined harmonics of said carrier and sum frequencies, demodulating means comprising first demodulation means responsive to said sum frequency $f_c'$ demodulating the data signal in the output of said automatic gain control means to produce data signals without said offset frequency, second demodulation means operating as a quadrature demodulator for demodulating the data signal in the output of said automatic gain control means, and means responsive to only predetermined signal frequency portions below said sum frequency adjusting the phase of said sum frequency $f_c'$ into a predetremined substantially constant phase relationship with said data signal, an automatic equalizer coupled to the output of said first demodulation means for compensating said data signal for said distortion therein, means cooperating with said automatic equalizer for adjusting the phase of said carrier frequency $f_c$ into a predetermined substantially constant relationship with said data signal, means responsive to said frequency $f_c$ in the output of said phase adjusting means decoding the data signals in the output of said equalizer, and error control means responsive to the output of said phase adjusting means for said carrier frequency $f_c$ and coupled to the output of said decoding means.

9. In combination, means receiving an amplitude modulated data signal having the carrier frequency $f_c$ suppressed, means responsive to said data signal generating a timing signal at said carrier frequency, means demodulating said data signal under the control of said timing signal, said demodulating means including means adjusting the phase of said timing signal as a function of the polarity of demodulated signal components of frequencies substantially lower than said carrier frequency, means decoding the demodulated data signal from said demodulator, and means coupled to said decoding means and to said generating means adjusting the phase of said timing signal as a function of the long time characteristic distribution of the transitions of said demodulated data signal through a plurality of predetermined amplitude levels.

10. In combination, means producing multilevel signals wherein plural predetermined positive and negative signal amplitude levels each represent different information characters, said signals being amplitude modulated on a carrier wave of predetermined frequency, means deriving a timing signal wave from said multilevel signals, and amplitude demodulating means receiving said multilevel signals and including means adjusting the phase of said timing signal in response to predetermined low frequency portions of the output of said demodulating means whereby the phase of said multilevel signal wave with respect to the phase of said timing wave is essentially the same as the phase relationship in said producing means, said demodulator phase adjusting means comprises first and second demodulators, means coupling said timing signal wave to said demodulators with the timing applied to said second demodulator being in quadrature phase relationship with respect to the carrier that is applied to said first demodulator, and means responsive to signal components in the outputs of said demodulators having frequencies below said carrier wave frequency and adjusting the phase of said timing signal wave so that the phase of the portion thereof applied to said first demodulator has the same relationship to said multilevel signals as said carrier frequency wave in said producing means.

11. The combination in accordance with claim 10 in which said phase adjusting means includes means for accomplishing phase adjustment over more than 360 electrical degrees for said timing signal wave.

12. In combination, means producing multilevel signals wherein plural predetermined positive and negative signal amplitude levels each represent different information characters, said signals being amplitude modulated on a carrier wave of predetermined frequency, means deriving a timing signal wave from said multilevel signals, and amplitude demodulating means receiving said multilevel signals and including means adjusting the phase of said timing signal in response to predetermined low frequency portions of the output of said demodulating means whereby the phase of said multilevel signal wave with respect to the phase of said timing wave is essentially the same as the phase relationship in said producing means, said phase adjusting means comprises first and second demodulators, means supplying said timing signal wave to said first and second demodulators in quadrature phase relationship with respect to one another, said producing means supplies to said first and second demodulators a train of steady unmodulated carrier frequency signals prior to the production of said modulated signals, comparing means, means coupling to said comparing means from the output of said second demodulator predetermined demodulation products having frequencies below said carrier frequency, means selectively coupling to said comparing means first and second signals during said steady carrier and during said data signals, respectively, said first signal being a predetermined voltage of reference polarity, said second signal being predetermined demodulation products in the output of said first demodulator which have frequencies below said carrier frequency, said reference polarity being the same polarity as the average low frequency output of said first demodulator when it is receiving steady carrier of correct phase.

13. The combination in accordance with claim 12 in which said phase adjusting means is normally inoperative, and said demodulating means includes means responsive to said low frequency output portions of at least one of said demodulators and enabling the operation of said phase adjusting means, said enabling means being so responsive for only those low frequency outputs in excess of a predetermined threshold amplitude level.

14. The combination in accordance with claim 12 in which said phase adjusting means is normally inoperative, and said demodulating means includes means responsive to said low frequency output portions of at least one of said demodulators and enabling the operation of said phase adjusting means, said enabling means being so responsive for only those lo wfrequency outputs below a predetermined threshold frequency level.

15. In combination, means producing multilevel signals wherein plural predetermined positive and negative signal amplitude levels each represent different information characters, said signals being amplitude modulated on a carrier wave of predetermined frequency, means deriving a timing signal wave from said multilevel signals, amplitude demodulating means receiving said multilevel signals and including means adjusting the phase of said timing signal in response to predetermined low frequency portions of the output of said demodulating means whereby the phase of said multilevel signal wave with respect to the phase of said timing wave is essentially the same as the phase relationship in said producing means, decoding means coupled to the output of said demodulating means, signal transition detecting means in said decoding means for detecting transitions of said data signal between any two of said plural predetermined positive and negative amplitude levels, and additional means in said decoding means responsive to the output of said detecting means for representing said information characters in binary coded form.

16. In combination, means receiving modulated multilevel coded signals, means generating oscillation wave outputs, demodulation means receiving said signals for producing demodulated signals, means receiving said demodulated signals for decoding the levels thereof, and means coupling different outputs of said generating means to said demodulation means and to said decoding means, said coupling means including means adjusting the phase of said outputs in accordance with a low frequency characteristic of said demodulated signals for said demodulation means and in accordance with a high frequency characteristic of said demodulated signals for said decoding means, said adjusting means comprising binary memory means producing first and second control signals during time intervals when said low and high frequency characteristics, respectively, are present in said demodulated signals, said first memory means maintaining said first control signal fixed in the absence of said low frequency characteristic and said second memory means maintaining said second characteristic fixed in the absence of said high signals, and phase changing means responsive to said first and second control signals for controlling the phase of said generating means outputs to said demodulation means and said decoding means, respectively, said changing means having a range of phase change capability greater than 360 electrical degrees of the oscillator wave output which it controls.

17. In combination, means receiving trains of vestigial sideband amplitude modulated data signal wherein each signal symbol is an amplitude level coded information character, means recovering a first timing signal at the carrier frequency of amplitude modulation from said data signal, a demodulator operating under the control of said recovered carrier frequency timing signal for deriving the baseband data signal from said amplitude modulated signal, said demodulator including means automatically controlling the phase of said recovered carrier frequency signal as a function of demodulator, low frequency, demodulation products having frequencies substantially below said recovered carrier frequency, said recovering means also including means producing a second timing signal, and means decoding the demodulated signal in the output of said demodulator under the control of said second timing signal, said decoding means including means automatically controlling the phase of said second timing signal as a function of the characteristic distribution of data signal incursions upon the plural predetermined information-determining levels of said output signals from said demodulator.

18. The combination in accordance with claim 17 in which said decoding phase controlling means includes means initially adjusting the phase of said recovered carrier frequency in coarse steps and thereafter adjusting such phase in fine steps.

19. The combination in accordance with claim 17 in which an automatic equalizer couples the output of said demodulator to said decoding means, each train of said data signal applied to said receiving means is preceded by a train of pulses having a standard configuration, and said decoding phase controlling means comprises means initially adjusting the phase in coarse steps to a predetermined maximum phase error in relation to said standard pulses, means initiating the operation of said equalizer in coarse steps upon the attainment of said maximum phase error relationship and for also initiating the operation of said phase adjusting means in fine steps, means responsive to the completion of said coarse steps of equalizer operation terminating said decoding phase adjustment in fine steps, and means restoring the operation of said decoding phase adjusting means in response to data signal transitions between said information-determining levels.

20. In combination, means receiving electric signals from a selectable one of plural transmission circuits, each of said circuits having different static transmission characteristics and all of said circuits having said characteristics dynamically variable in an indeterminate manner, means continuously compensating the amplitude of signals from said receiving means for said dynamically variable characteristics, means generating a timing signal, means equalizing the baseband portion of said electric signals to compensate for said static characteristics, means adjusting the phase of said timing signal to a predetermined relationship with respect to the phase of said baseband portion of said signals, means coupled to said equalizing means for decoding said baseband portion of said signals in response to said timing signal, means coupling said equalizing means and said phase adjusting means together for initially making coarse phase adjustments on unequalized signals from said receiving means and for thereafter initiating the simultaneous operation of said equalizer in coarse steps and of said phase adjusting means in fine steps in response to equalized signals, and said coupling means being responsive to the completion of said coarse steps of equalization for coupling said baseband signals to said decoder and to said phase adjusting means for controlling the operation thereof in response to predetermined characteristics of said baseband signals.

References Cited

UNITED STATES PATENTS

| | | | |
|---|---|---|---|
| 2,871,295 | 1/1959 | Stachiewicz | 325—49 |
| 3,071,739 | 1/1963 | Runyon | 328—155 X |
| 3,152,305 | 10/1964 | Becker et al. | 325—50 |
| 3,185,963 | 5/1965 | Peterson et al. | 307—88.5 |
| 3,196,352 | 7/1965 | Hopner et al. | 325—49 |

ROBERT L. GRIFFIN, *Primary Examiner.*

J. T. STRATMAN, *Assistant Examiner.*